(12) United States Patent
Holmes

(10) Patent No.: US 9,070,237 B2
(45) Date of Patent: Jun. 30, 2015

(54) MOIRE MAGNIFICATION DEVICE

(75) Inventor: Brian William Holmes, Fleet (GB)

(73) Assignee: DE LA RUE INTERNATIONAL LIMITED, Hampshire (GB)

( * ) Notice: Subject to any disclaimer, the term of this patent is extended or adjusted under 35 U.S.C. 154(b) by 321 days.

(21) Appl. No.: 13/580,797

(22) PCT Filed: Mar. 1, 2011

(86) PCT No.: PCT/GB2011/050398
§ 371 (c)(1),
(2), (4) Date: Oct. 24, 2012

(87) PCT Pub. No.: WO2011/107782
PCT Pub. Date: Sep. 9, 2011

(65) Prior Publication Data
US 2013/0050819 A1 Feb. 28, 2013

(30) Foreign Application Priority Data
Mar. 1, 2010 (GB) .................................. 1003397.5

(51) Int. Cl.
| | |
|---|---|
| *G02B 27/22* | (2006.01) |
| *G03H 1/00* | (2006.01) |
| *G02B 5/32* | (2006.01) |
| *G02B 27/10* | (2006.01) |
| *G07D 7/00* | (2006.01) |

(Continued)

(52) U.S. Cl.
CPC .......... *G07D 7/0006* (2013.01); *B42D 2035/20* (2013.01); *B42D 2035/44* (2013.01); *G02B 3/0056* (2013.01); *G07D 7/2066* (2013.01); *B42D 25/342* (2013.01)

(58) Field of Classification Search
None
See application file for complete search history.

(56) References Cited

U.S. PATENT DOCUMENTS

| | | | |
|---|---|---|---|
| 4,652,015 A | 3/1987 | Crane | |
| 5,694,229 A | 12/1997 | Drinkwater et al. | |

(Continued)

FOREIGN PATENT DOCUMENTS

| | | |
|---|---|---|
| AU | 734 937 B2 | 6/2001 |
| CA | 2 581 142 A1 | 3/2006 |

(Continued)

OTHER PUBLICATIONS

Hutley et al., "The Moiré Magnifier", Pure Appl. Opt. 3 (1994) pp. 133-142 published by IOP Publishing Limited.

(Continued)

*Primary Examiner* — Jade R Chwasz
(74) *Attorney, Agent, or Firm* — Oliff PLC

(57) ABSTRACT

A moire magnification device is disclosed, including a transparent substrate carrying: a regular array of micro-focusing elements on a first surface, the focusing elements defining a focal plane; and a corresponding first array of microimage elements located in a plane substantially coincident with the focal plane of the focusing elements. The pitches of the micro-focusing elements and the array of microimage elements and their relative locations are such that the array of micro-focusing elements cooperates with the array of microimage elements to generate magnified version of the microimage elements due to the moire effect. Along at least one axis across at least a first region of the device, the pitch between the microimage elements and/or between the micro-focusing elements continuously varies across the respective array(s), whereby the moire effect causes different degrees of magnification of the image elements to occur.

25 Claims, 19 Drawing Sheets

(51) Int. Cl.
*G07D 7/20* (2006.01)
*B42D 25/342* (2014.01)
*G02B 3/00* (2006.01)

(56) References Cited

U.S. PATENT DOCUMENTS

| | | |
|---|---|---|
| 6,508,489 B2 | 1/2003 | Herrmann et al. |
| 2004/0084893 A1 | 5/2004 | Fan et al. |
| 2007/0075150 A1 | 4/2007 | Luthi et al. |
| 2008/0067801 A1 | 3/2008 | Schilling et al. |
| 2008/0160226 A1 | 7/2008 | Kaule et al. |
| 2008/0284157 A1 | 11/2008 | Muke et al. |
| 2009/0034082 A1* | 2/2009 | Commander et al. ........ 359/619 |
| 2009/0102605 A1 | 4/2009 | Kaule |
| 2009/0297805 A1 | 12/2009 | Dichtl |
| 2010/0177094 A1 | 7/2010 | Kaule et al. |
| 2011/0109078 A1 | 5/2011 | Hoffmuller et al. |
| 2012/0193905 A1 | 8/2012 | Schilling et al. |
| 2012/0274998 A1 | 11/2012 | Holmes et al. |

FOREIGN PATENT DOCUMENTS

| | | |
|---|---|---|
| DE | 10 2004 056 553 A1 | 5/2006 |
| DE | 10 2007 029 204 A1 | 1/2009 |
| DE | 10 2008 029 638 A1 | 12/2009 |
| EP | 0 059 056 A1 | 9/1982 |
| EP | 0 279 526 A2 | 8/1988 |
| EP | 0 723 501 B1 | 7/1996 |
| EP | 0 724 519 | 8/1996 |
| EP | 0 860 298 A2 | 8/1998 |
| EP | 1 398 174 A1 | 3/2004 |
| EP | 1 897 700 A2 | 3/2008 |
| GB | 1 407 065 | 9/1975 |
| JP | A-2001-26175 | 1/2001 |
| JP | 2003-039583 A | 2/2003 |
| JP | A-2004-317636 | 11/2004 |
| JP | 2005-007593 A | 1/2005 |
| JP | 2008-012870 A | 1/2008 |
| JP | A-2008-513816 | 5/2008 |
| JP | 2008-529851 A | 8/2008 |
| JP | A-2009-086210 | 4/2009 |
| JP | A-2009-536885 | 10/2009 |
| JP | 2009-262375 A | 11/2009 |
| JP | A-2009-541873 | 11/2009 |
| JP | A-2009-543138 | 12/2009 |
| JP | 2013-504451 A | 2/2013 |
| WO | WO 83/00659 A1 | 3/1983 |
| WO | WO 94/27254 A1 | 11/1994 |
| WO | WO 00/39391 A1 | 7/2000 |
| WO | WO 01/23943 A1 | 4/2001 |
| WO | WO 03/054297 A2 | 7/2003 |
| WO | WO 03/091952 A2 | 11/2003 |
| WO | WO 03/091953 A2 | 11/2003 |
| WO | WO 03/095188 A2 | 11/2003 |
| WO | WO 2005/052650 A2 | 6/2005 |
| WO | WO 2005/106601 A2 | 11/2005 |
| WO | WO 2006/125224 A2 | 11/2006 |
| WO | WO 2007/133613 A2 | 11/2007 |
| WO | WO 2008/000351 A2 | 1/2008 |
| WO | WO 2008/008635 A2 | 1/2008 |
| WO | WO 2009/121578 A2 | 10/2009 |
| WO | WO 2009/139396 A1 | 11/2009 |
| WO | WO 2009/156079 | 12/2009 |

OTHER PUBLICATIONS

Jun. 27, 2011 International Search Report issued in International Application No. PCT/GB2011/050407.
Jun. 7, 2011 International Search Report issued in International Application No. PCT/GB2011/050399.
Jun. 10, 2011 International Search Report issued in International Application No. PCT/GB2011/050398.
Jun. 30, 2011 International Search Report issued in International Application No. PCT/GB2011/050404.
Office Action dated Sep. 29, 2014 issued in U.S. Appl. No. 13/580,784.
Oct. 29, 2013 Office Action issued in Japanese Patent Application No. 2012-555490 (with translation).
Oct. 29, 2013 Office Action issued in Japanese Patent Application No. 2012-555491 (with translation).
Jun. 10, 2014 Office Action issued in U.S. Appl. No. 13/580,837.
U.S. Appl. No. 13/580,837, filed in the name of Holmes, on Oct. 24, 2012.
U.S. Appl. No. 13/580,784, filed in the name of Holmes, on Oct. 19, 2012.
U.S. Appl. No. 13/580,730, filed in the name of Holmes, on Oct. 24, 2012.
Jan. 6, 2015 Office Action issued in Japanese Patent Application No. 2012-555489.
Jan. 6, 2015 Office Action issued in Japanese Patent Application No. 2012-555488.
Nov. 6, 2014 Office Action issued in U.S. Appl. No. 13/580,730.
Mar. 11, 2015 Office Action issued in U.S. Appl. No. 13/580,730.

* cited by examiner

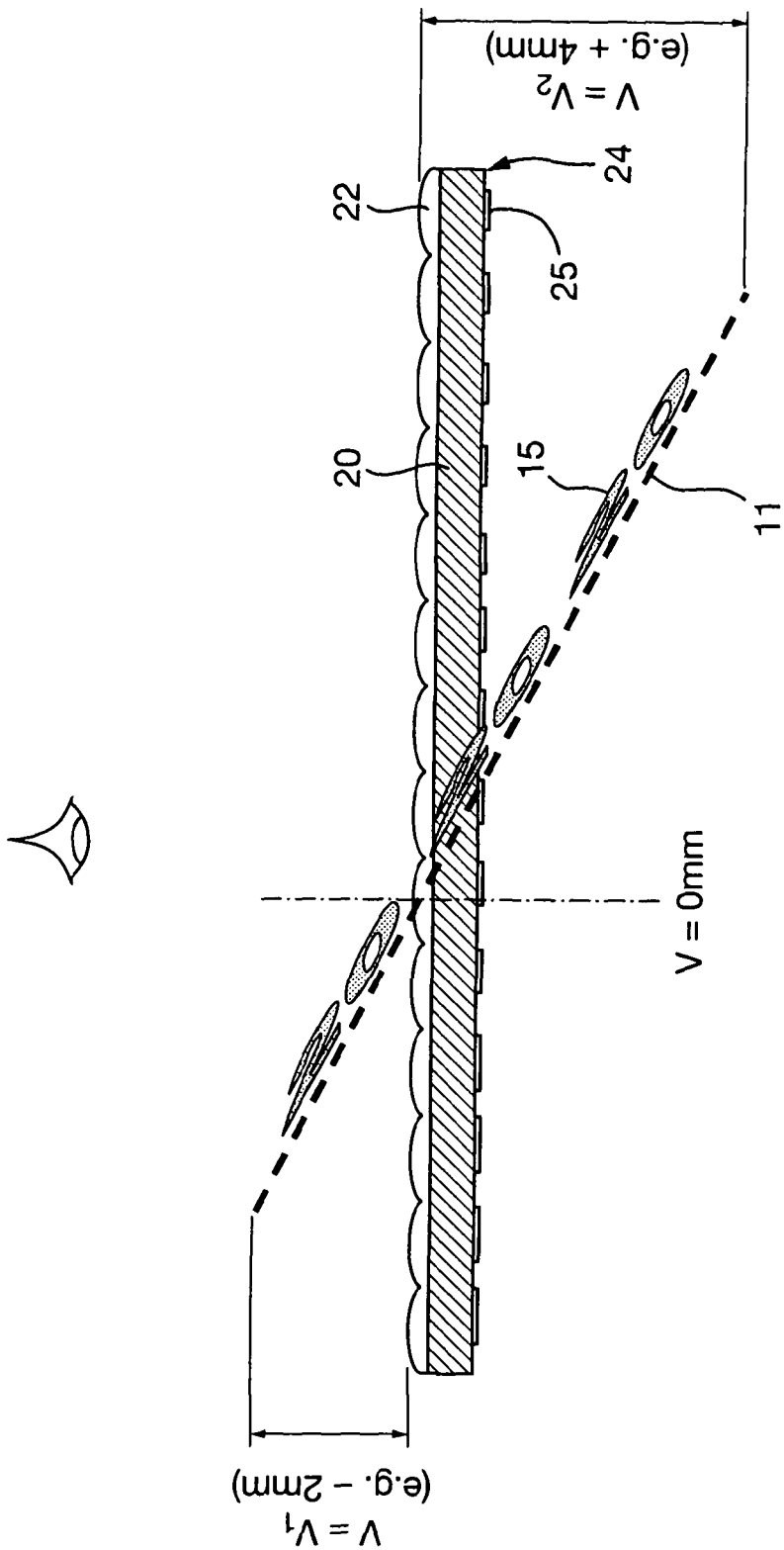

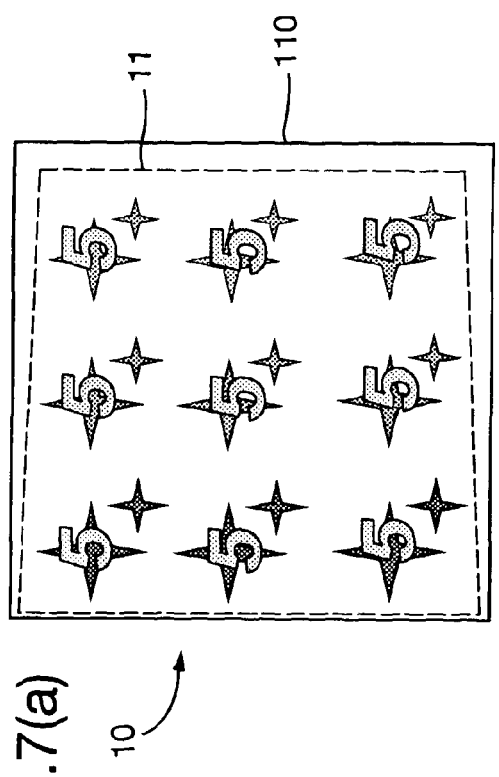
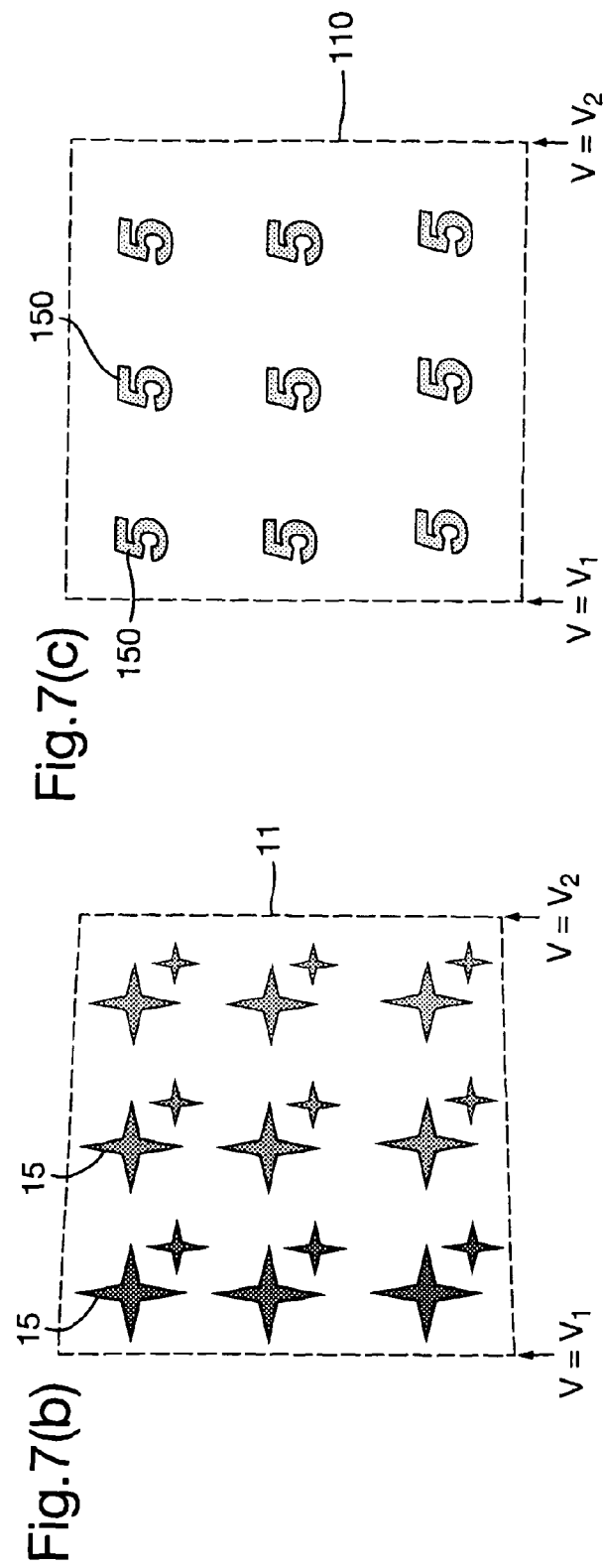

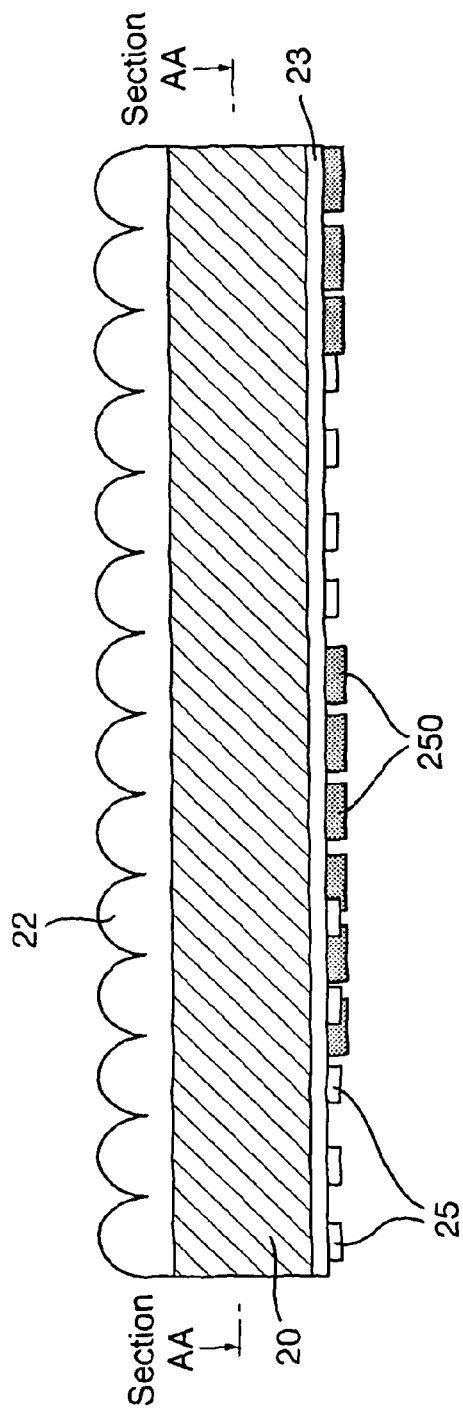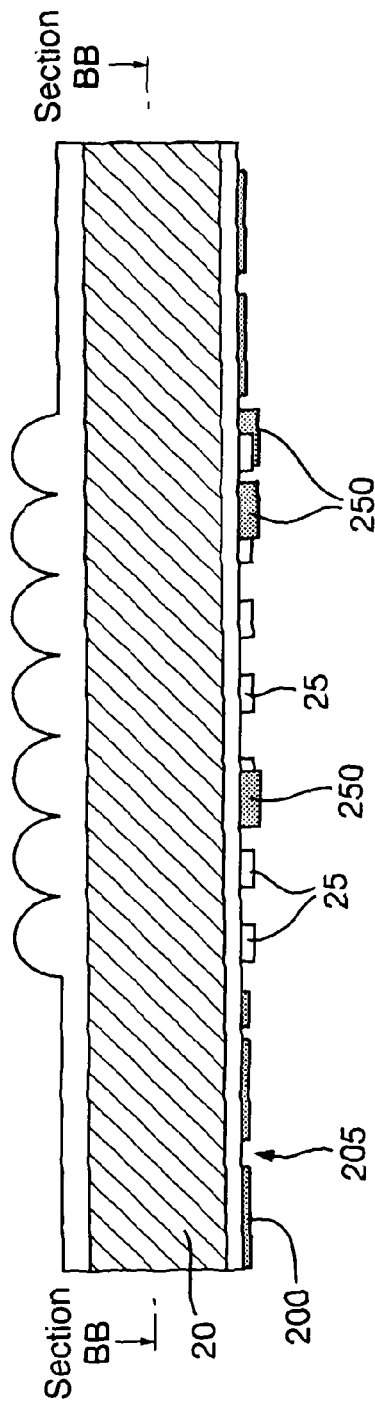

MOIRE MAGNIFICATION DEVICE

The invention relates to a moiré magnification device such as a security device, for example for use on security documents and other articles of value such as banknotes, cheques, passports, identity cards, certificates of authenticity, fiscal stamps and other documents for securing value or personal identity. It also relates to optical devices for use on packaging or the like.

Moiré magnification has been used as the basis of security devices for a number of years. A number of examples are described in WO-A-94/27254 and EP-A-1695121. In such a device, a regular array of micro-focusing elements defining a focal plane is provided over a corresponding array of image elements located in a plane substantially aligned with the focal plane of the focusing elements. The pitch or periodicity of the array of image elements is chosen to differ by a small factor from the pitch or periodicity of the focusing elements and this mismatch means that magnified versions of the image elements are generated.

The magnification factor depends upon the difference between the periodicities or pitches. A pitch mismatch between a microlens array and a microimage array can also conveniently be generated by rotating the microimage array relative to the microlens array or vice-versa, such that the microlens array and microimage array have a rotational misalignment. The rotational misalignment or the small pitch mismatch results in the eye observing a different part of the image in each neighbouring lens resulting in a magnified image. If the eye is then moved relative to the lens/image array a different part of the image is observed giving the impression that the image is in a different position. If the eye is moved in a smooth manner a series of images are observed giving rise to the impression that the image is moving relative to the surface. In the case where the pitch mismatch is generated by rotational misalignment the array of magnified images is rotated relative to the microimage array and consequently the parallax affect that results in the apparent movement of the magnified image is also rotated and this is known as skew parallax. The effect of pitch mismatch and rotational misalignment on the magnification and rotation of the magnified image observed in a moiré magnifier is described in "The Moiré Magnifier", M. Hutley, R Hunt, R F Stevens and P Savander, Pure Appl. Opt. 3 (1994) 133-142 published by IOP Publishing Limited.

The nature of the movement and orientation changes can be explained from the theory of moiré; this is discussed in detail in "The theory of the Moiré phenomenon" by I. Amidror published by Kluiver Academic Publishers in 2000, ISBN 0-7923-5949-6. The moiré effect of two periodic structures can be explained/predicted by considering the frequency vectors of the two structures. The orientation of the frequency vector represents the direction of the periodicity and the length represents the frequency (i.e. 1/Period). The vector is expressed by its Cartesian coordinates (u,v) where u and v are the horizontal and vertical components of the frequency.

The principles involved are discussed in more detail in WO-A-2005/106601.

Typically, the focusing elements comprise microlenses or micromirrors and the image elements are defined by simple icons or the like.

It is also known to provide multiple images in a moiré magnifying device. For example, WO-A-94/27254 illustrates an image switch effect on tilting a device. WO-A-2005/106601 describes how two magnified image sets can be caused to move at different rates as the device is tilted. Another example is described in WO-A-2009/139396.

There is a constant need to increase the visual impact achieved by such devices, particularly where the device is to be used as a security device. Increased visual impact increases the device's effectiveness as a marker of authenticity, since typically an enhanced effect will be more difficult for a counterfeiter to reproduce. Moreover the difference between a genuine device and a attempted copy formed by other means will be more obvious to a person handling an article carrying the device. Additionally, in other fields where the device is to be used in a decorative capacity, an increased visual impact is equally desirable.

In accordance with the present invention, a moiré magnification device is provided which comprises a transparent substrate carrying:
  i) a regular array of micro-focusing elements on a first surface, the focusing elements defining a focal plane; and
  ii) a corresponding first array of microimage elements located in a plane substantially coincident with the focal plane of the focusing elements,
wherein the pitches of the micro-focusing elements and the array of microimage elements and their relative locations are such that the array of micro-focusing elements cooperates with the array of microimage elements to generate magnified version of the microimage elements due to the moiré effect, and wherein, along at least one axis across at least a first region of the device, the pitch between the microimage elements and/or between the micro-focusing elements continuously varies across the respective array(s), whereby the moiré effect causes different degrees of magnification of the image elements to occur, such that the viewer perceives that the magnified elements are located on a first image surface which is tilted or curved relative to the surface of the device.

Until now, all known moiré magnifier devices show synthetically magnified images which are in a image plane which is essentially parallel to the plane of the device.

By arranging the pitch mismatch between the micro-focusing elements and the microimages to vary continuously (as a result of varying the pitch of the microimage elements and/or that of the micro-focusing elements), the present invention provides a device wherein the magnified image seen by the observer has an image plane or surface which appears noticeably tilted or curved relative to the plane of the device. This new and surprising visual effect significantly enhances the appearance of the device. Moreover, the security level associated with the device is substantially increased since the necessary pitch variation increases the complexity of manufacture and hence further deters would-be counterfeiters.

It should be noted that, due to the potential for the magnified images to appear curved, the term "image surface" will generally be used in place of the term "image plane". However, in places where the latter term is used, it will be appreciated that the "plane" is not limited to being flat unless otherwise specified.

The term "continuously varies" in this context means that the pitch variation across the or each array (of micro-focusing elements or microimage elements) is such that the resulting image surface on which the magnified image elements are perceived appears substantially smooth, rather than stepped, to the human eye. The distribution of pitch variation required to achieve this will depend, in part, on the number and spacing of the (microimage or micro-focusing) elements as well as on the magnification level and the resolving power of the human eye. As such, in some cases, it may be sufficient if two or more adjacent pairs of elements have the same pitch, before the pitch decreases or increases for the next group of N elements (N>2). However, in general it is preferred that the pitch changes from one pair of elements to the next. That is, the spacing between any one element and its first neighbour (along one axis) will preferably be different to that between it and its second neighbour (in the opposite direction along the same axis). As will be explained in detail below, the term "continuously" does not require that the pitch varies by the same amount between each element pair (or group of pairs), although this is of course not excluded.

Preferably, in the first region of the device, the pitch between the microimage elements and/or between the micro-focusing elements continuously varies in the same sense. That is, the pitch continuously increases or continuously decreases across the first region. This has the result that the image surface across the whole of the first region tilts or curves either towards or away from the viewer. However, in other examples the variation could change sense (e.g. switch from increasing to decreasing) once or at intervals to produce additional optical effects with the surface appearing to move towards and away from the viewer at different locations.

In particularly preferred implementations, the pitch varies along only one of the two orthogonal axes of the array(s), having the effect that the image surface is tiled or curved along one direction only. However, in other advantageous embodiments, in the first region of the device the pitch between the microimage elements and/or between the micro-focusing elements continuously varies in both orthogonal axes of the respective array(s). This further increases the complexity and hence security of the device, resulting in an image plane that appears to tile or curve in both directions.

The microimage elements in the array can all be identical, in which case the varying magnification levels across the device will cause size distortion. This can be used as a visual effect in itself. However, in preferred embodiments, the size of the microimage elements varies in a corresponding manner such that the viewer perceives that the magnified image elements have substantially the same size as each other on the first image surface. This is particularly effective since the tilted or curved image surface is very clearly distinguishable to the viewer.

The position of the image surface can be controlled as desired through control of the relative pitches, sizing and location of the micro-focusing and microimage elements. In some preferred examples, the pitches of the micro-focusing elements and the array of microimage elements and their relative locations are such that the first image surface is positioned behind or in front of the surface of the device. In other advantageous implementations, the pitches of the micro-focusing elements and the array of microimage elements and their relative locations are such that the first image surface intersects the surface of the device.

The tilted or curved nature of the image surface can also be used to distinguish one array of microimage elements from another. Thus, in a particularly preferred embodiment, the device further comprises in at least the first region of the device:

iii) a corresponding second array of microimage elements carried by the substrate, located in a plane substantially coincident with the focal plane of the focusing elements, wherein the pitches of the micro-focusing elements and the second array of microimage elements and their relative locations are such that the array of micro-focusing elements cooperates with the second array of microimage elements to generate magnified versions of the microimage elements of the second array due to the moiré effect, and such that the viewer perceives that the magnified version of the second array of microimage elements are located on a second image surface which is different from the first image surface, the magnified version of the first array of microimage elements exhibiting movement relative to the magnified version of the second array of microimage elements when the device is tilted.

In this way, the first and second arrays of magnified image elements appear to be located on different surfaces, at least one of which is tilted or curved. The second image surface may be parallel to the device or may be tilted or curved by continuously varying the elements using the same principles as applied for the first microimage array. If it is tilted or curved, the second image surface may be parallel to and spaced above or below the first image surface. Whether the second surface is tilted, curved or parallel to the device surface, it can if desired be configured to intersect the first image surface at one or more locations.

Though not essential, it is particularly desirable if the first array of microimage elements is in a first colour and the second array of microimage elements is in a second colour which is different from the first colour (e.g. red and blue, yellow and green, white and black). This is because, in conventional devices it is impossible to have multi-coloured images since the two or more colours of ink cannot be printed with sufficient register at the small dimensions required to form the micro-image elements of a single array. However, in the present invention the two colours are utilised in different arrays and are arranged to appear on a different image surface.

In many cases, the first region of the device may extend to include the whole area of the arrays, such that a single tilted or curved surface is apparent. However, as already alluded to, additional effects can be achieved if the pitch variation is arranged to change in sense between one part of the device and another. More generally, therefore, in advantageous embodiments, the pitch between the microimage elements and/or between the micro-focusing elements additionally varies continuously along at least one axis across a second region of the device, the pitch variation in the second region preferably being in the opposite sense to that in the first region, such that the viewer perceives that the magnified elements are located on a first image surface which is tilted or curved relative to the surface of the device differently to that perceived in the first region. The second region could, for example, be configured such that the image surface appears to tilt in the opposite direction to that in the first region so that the first and second regions together appear as a sharp "valley" or "hill" pointing towards or away from the viewer. Curved versions are also possible. In other example, the direction of tilt/curvature could be the same in both regions, with for example the angle of tilt changing between them, to produce a more subtle effect. Any number of such regions could be incorporated.

As already mentioned, the different degrees of magnification are achieved by arranging the pitch of the micro-focusing elements and/or of the microimage elements to vary across the device. It is the amount of mismatch between the micro-focusing element array pitch and the micro-image element array pitch that determines the magnification level. As such, this can be manifested through varying either the pitch of the micro-focusing elements or the pitch of the microimage elements, or both. In practice it is generally more convenient to vary the pitch of the microimage elements rather than the microfocusing elements and so, in preferred implementations, the array of micro-focusing elements has a constant pitch across at least the first region of the device, the different degrees of magnification being achieved by continuous variation of the pitch of the first and/or second arrays of microimage elements. This is particularly the case where there are two or more arrays of microimage elements but it is still not essential since, if there is a pitch variation in the micro-focusing element array, it can be taken into account when determining the pitch of the second microimage element array so as to remove its effect if desired (e.g. the second image surface can still be arranged to be parallel to the device surface by matching the pitch variation in the second microimage element array to that of the micro-focusing element array).

In certain preferred embodiments, the micro-focusing elements comprise microlenses such as spherical lenslets, cylindrical lenslets, plano-convex lenslets, double convex lenslets, Fresnel lenslets and Fresnel zone plates. Advantageously, each microlens has a diameter in the range 1 to 100 microns, preferably 1 to 50 microns and even more preferably 10 to 30 microns.

In other embodiments, however, the same effects can be achieved using mirrors. Here, preferably the micro-focusing elements comprise concave mirrors.

Advantageously, the microimage elements within each array represent identical indicia, optionally varying in size and/or aspect ratio across the respective array (e.g. to avoid size distortion effects as mentioned above).

Preferably, the microimage elements comprise icons such as symbols, geometric figures, alphanumeric characters, logos or pictorial representations; or backgrounds such as line patterns, for example parallel (straight) lines, simple geometric figures or complex line structures such as guilloche patterns. In examples with two or more microimage element arrays, preferably wherein the microimage elements of the first or the second array comprise icons, such as symbols, geometric figures, alphanumeric characters, logos or pictorial representations, and the microimage elements of the other array define a background, such as line patterns, for example parallel (straight) lines, simple geometric figures or complex line structures such as guilloche patterns. Advantageously, the "background" image surface appears behind the "icon" image surface.

In preferred examples, the microimage elements are printed on the substrate using any suitable scale adapted printing process such as gravure, wet or dry lithographic printing, screen printing, intaglio printing and flexo printing. However, one or more of the arrays of microimage elements could also be formed as grating structures, recesses or other relief patterns on the substrate. Anti-reflection structures may also be used as described in WO-A-2005/106601.

Micro-focusing elements, such as microlenses and concave mirrors, are preferably formed by embossing into the substrate surface, cast-curing or the like.

Moiré magnifiers generated by the current invention can be either 2-dimensional (2D) or 1-dimensional (1D) structures. 2D moiré magnification structures using spherical lenses are described in more detail in EP-A-1695121 and WO-A-94/27254. In a 2D moiré magnifier the microimages are magnified in all directions. In a 1D moiré magnification structure the spherical microlenses or micromirrors are replaced with a repeating arrangement of cylindrical microlenses or micromirrors. The result of this is that the micro-image elements are subject to moiré magnification in one axis only which is the axis along which the mirrors exhibit their periodic variations in curvature or relief. Consequently the micro-images are strongly compressed or de-magnified along the magnification axis whilst the size or dimension of the micro image elements along the axis orthogonal to the magnification axis is substantially the same as they appear to the observer—i.e. no magnification or enlargement takes place.

The moiré magnifier generated by the current invention can form a security device by itself but could also be used in conjunction with other security features such as holograms, diffraction gratings and other optically variable effect generating structures.

The optical device of the current invention can be used to authenticate a variety of substrates—with the nature of the substrate, in particular its thickness and flexibility having an influence on the corresponding properties of the optical device.

The invention has particular value in protecting flexible substrates such as paper and in particular banknotes, where the device could define a patch, strip or thread. The thickness of the device will be influenced by how its employed within the banknote though to both avoid deformation of paper ream shape during the banknote printing process and further more the form and flexibility of the banknote itself, it is desirable that the thickness of the device does not exceed half of the thickness of the banknote itself (typically 85-120 um)—therefore it anticipated that in any embodiment the optical device will be less than 50 um including securing adhesives and preferably substantially so.

For example as a patch applied to a banknote the desired thickness will range from a few microns (excluding securing adhesive) to a maximum of 35-40 um (again excluding adhesive) for a label. Whilst for the case of a strip, the thickness will range again from a few micrometers for the case of a hot-stamped or transferred strip, up to 35-40 um for the case of a non transferred strip wherein the supporting carrier layer is retained (again excluding securing adhesives) as would be necessary should the strip be applied over a mechanical aperture in the banknote substrate.

In the case of a windowed thread preferred final thickness is in the range of 20-50 um.

Thicker versions of the security device (up to 300 μm) could be employed in applications which include passport paper pages, plastic passport covers, visas, identity cards, brand identification labels, anti-tamper labels—any visually authenticable items.

Furthermore, the device could be provided in a transparent window of a security document to enable it to be viewed in transmission.

The invention further provides an article provided with an optical device as described above. The article preferably comprises one of banknotes, cheques, passports, identify cards, certificates of authenticity, fiscal stamps and other documents for security value or personal identity.

Some examples of security devices according to the invention will now be described with reference to the accompanying drawings, in which:

FIG. 6 is a cross section of the device of FIG. 5, illustrating the resulting image surface;

Figure 8:
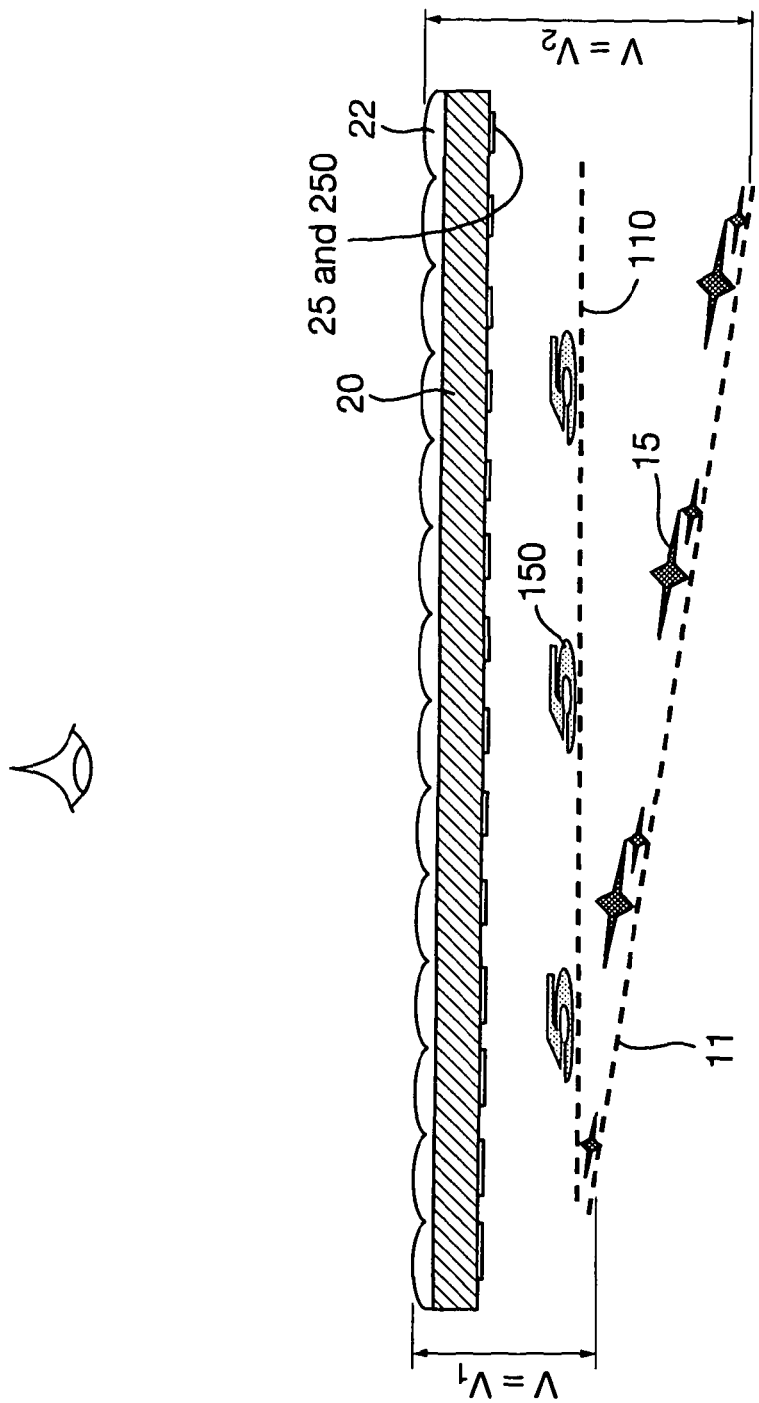
Figure 9:
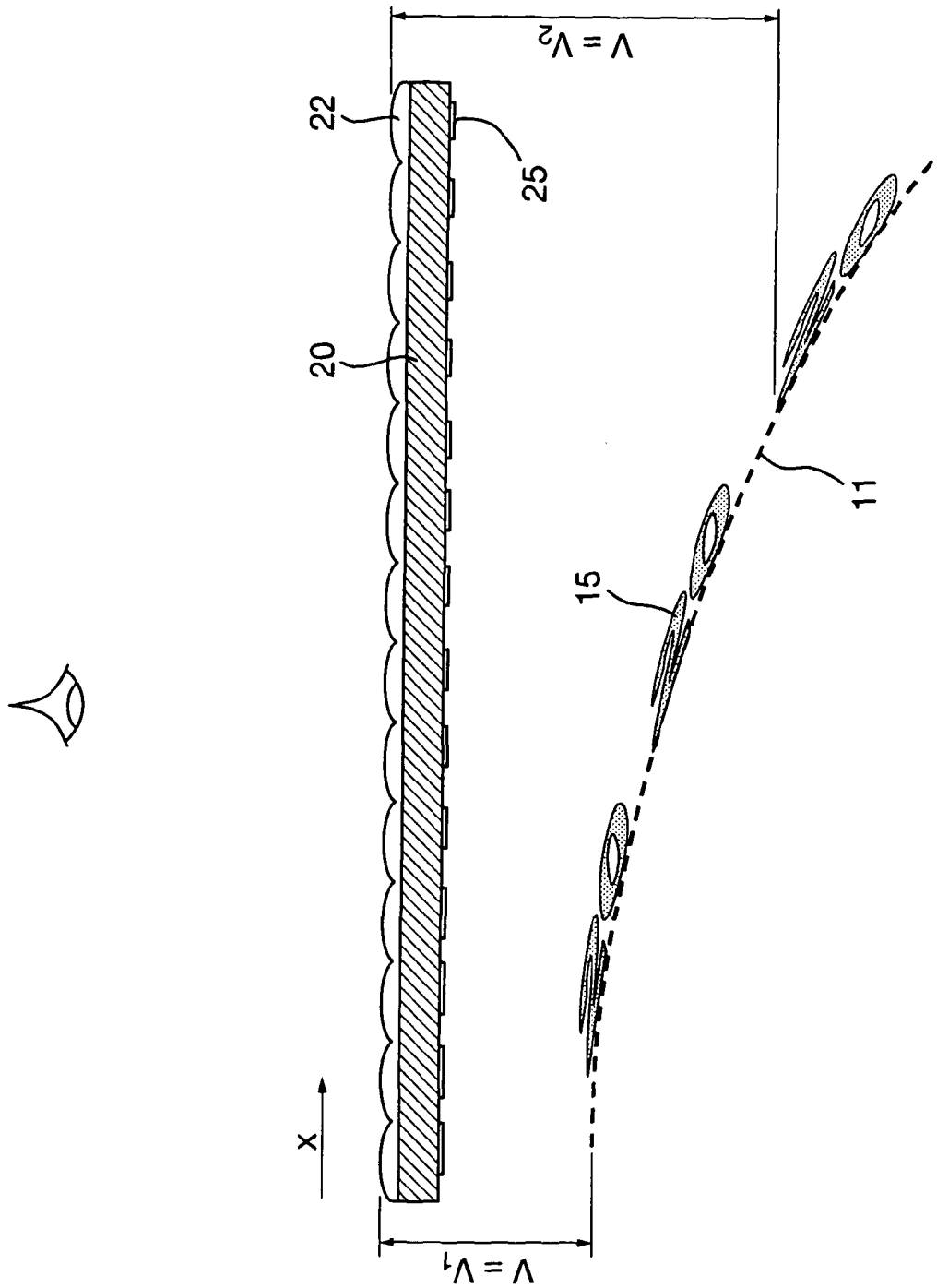
Figure 10:
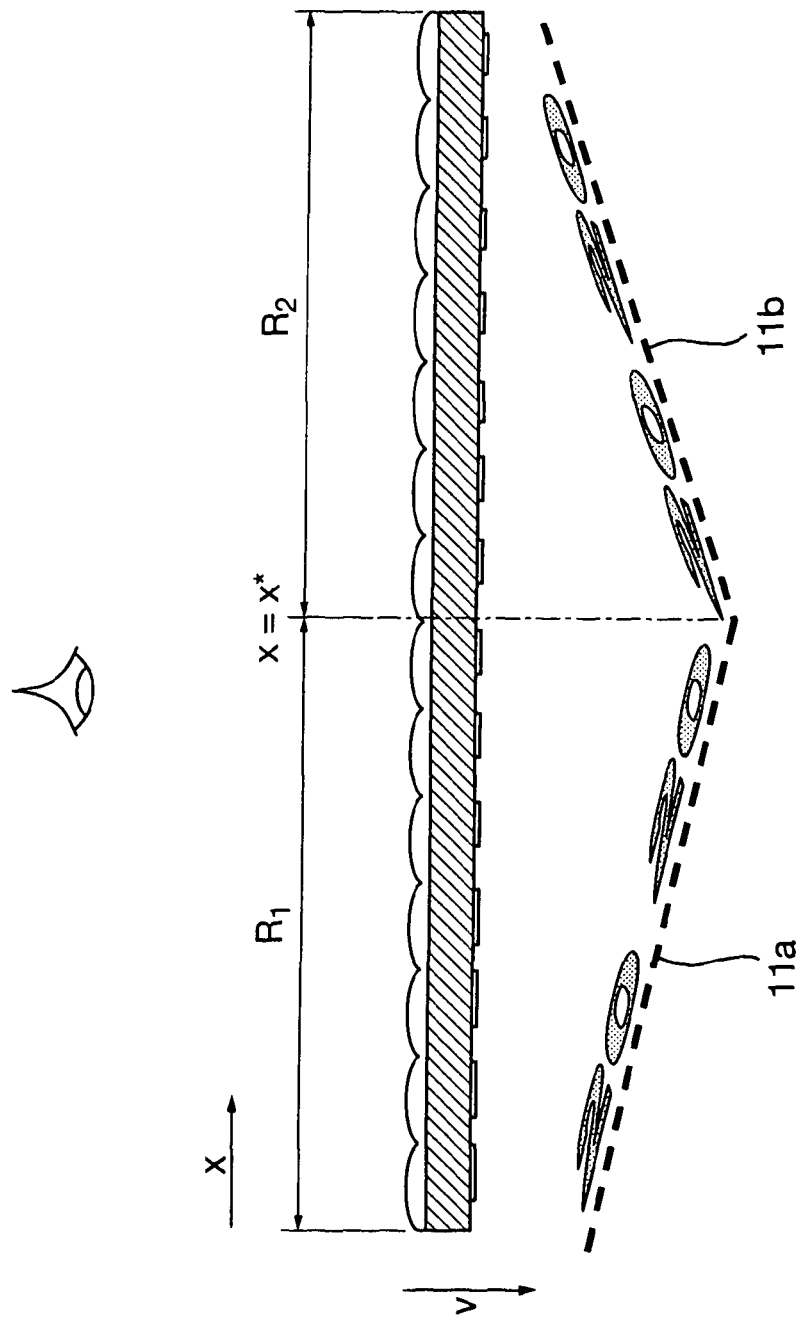
Figure 11:
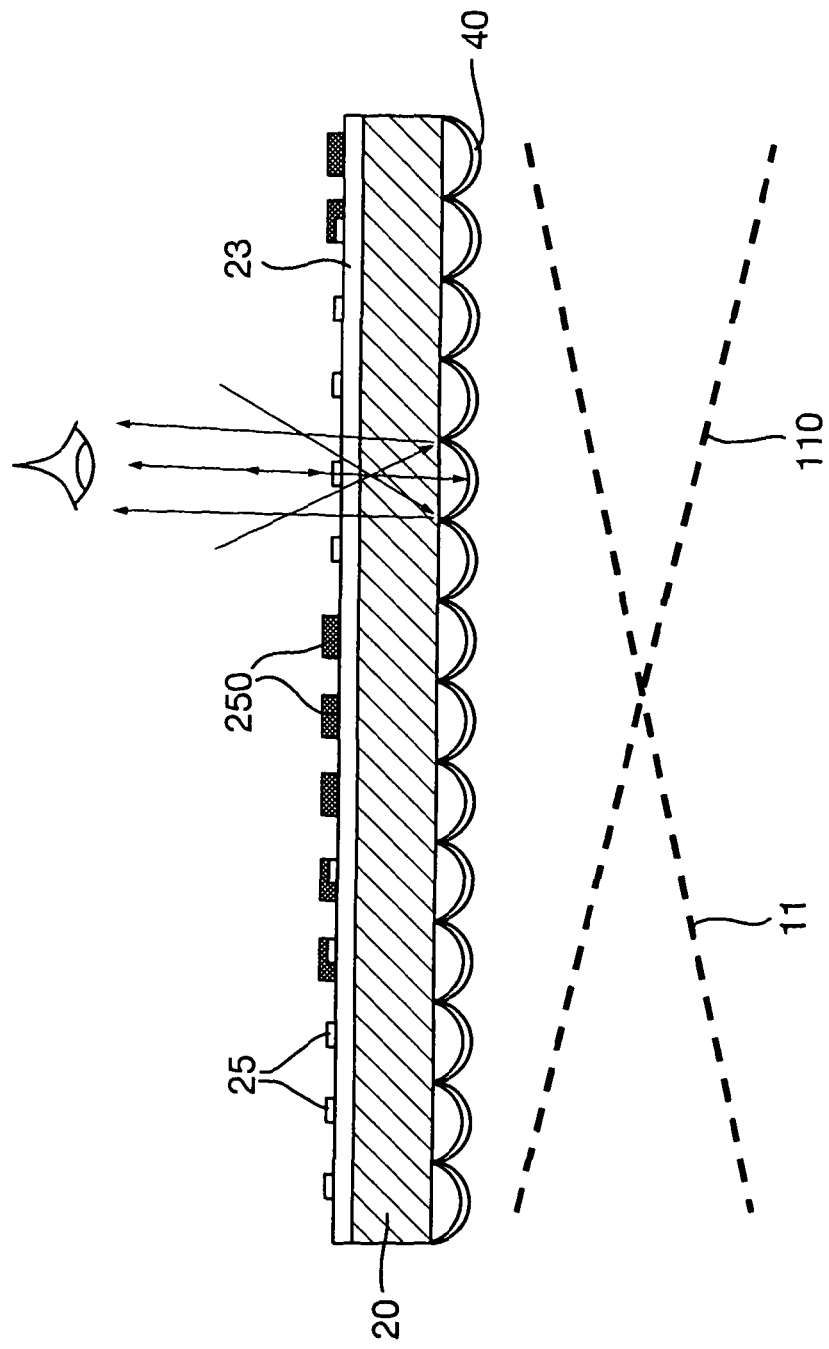
Figure 12A:
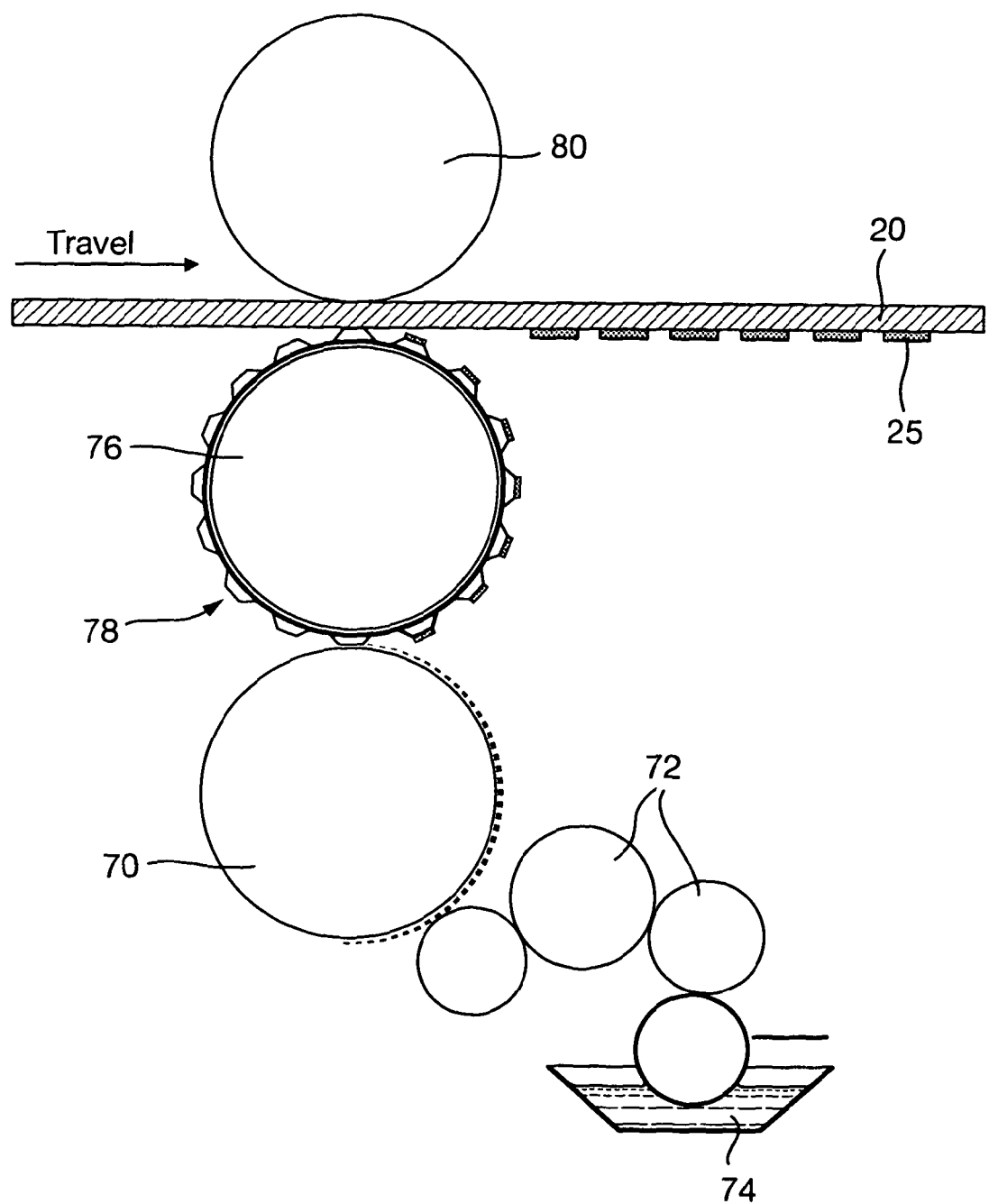
Figure 12B:
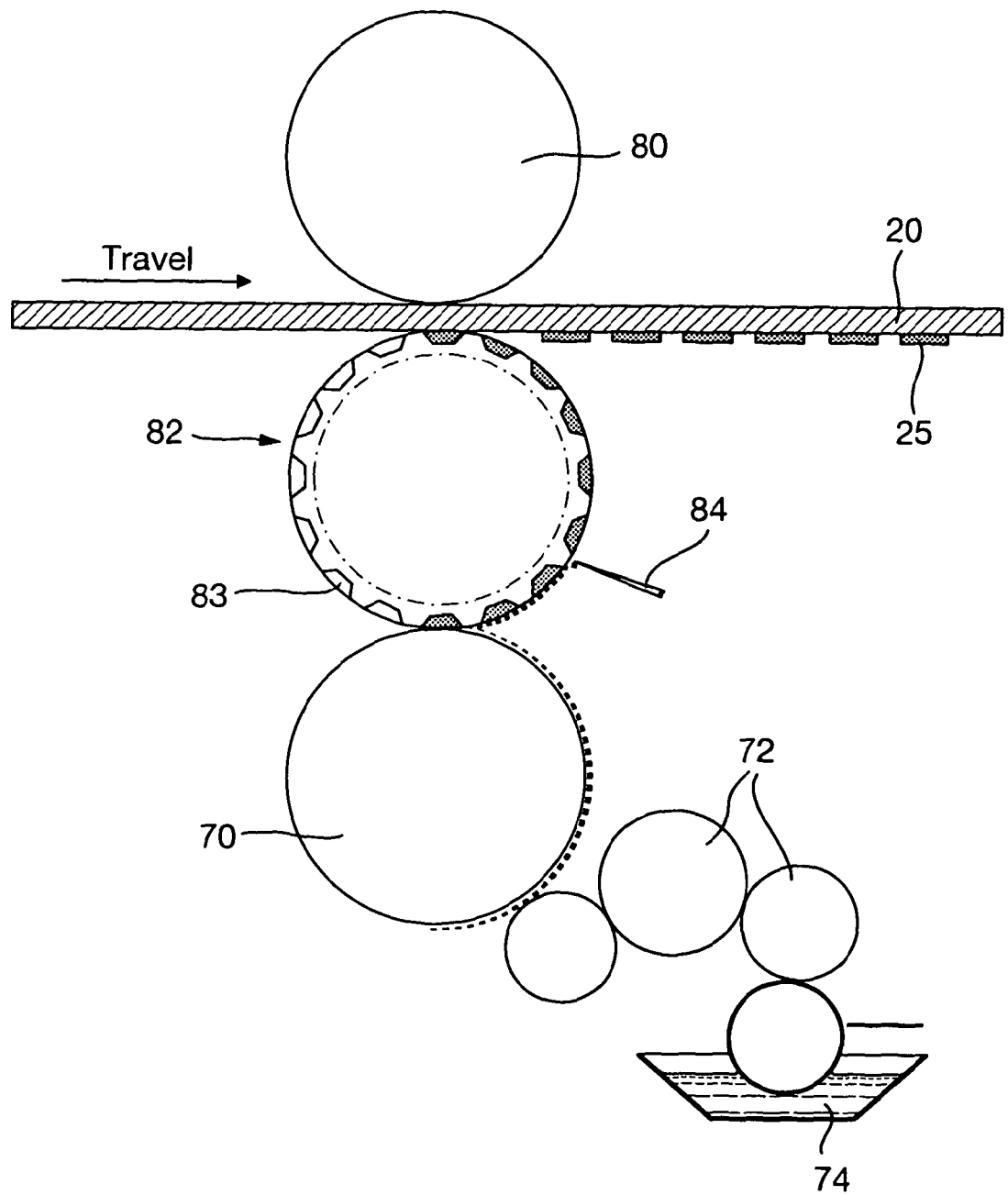
Figure 14:
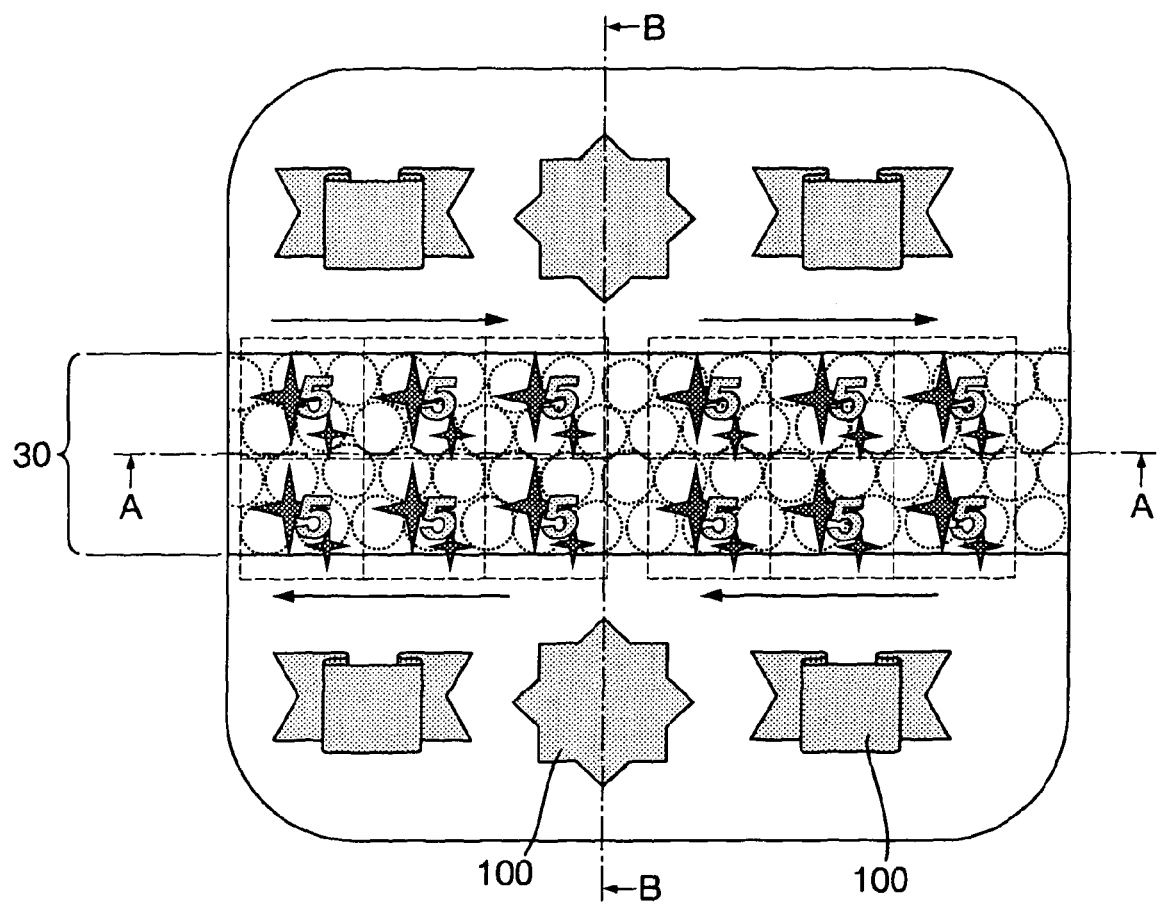
Figure 15:
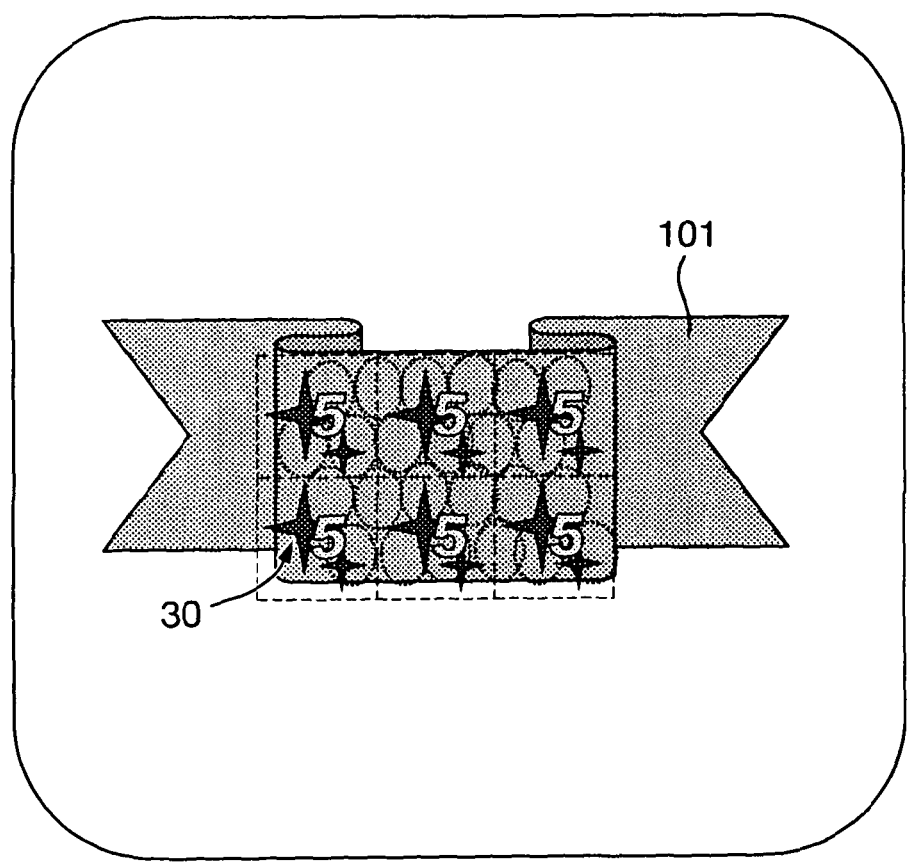
Figure 16:
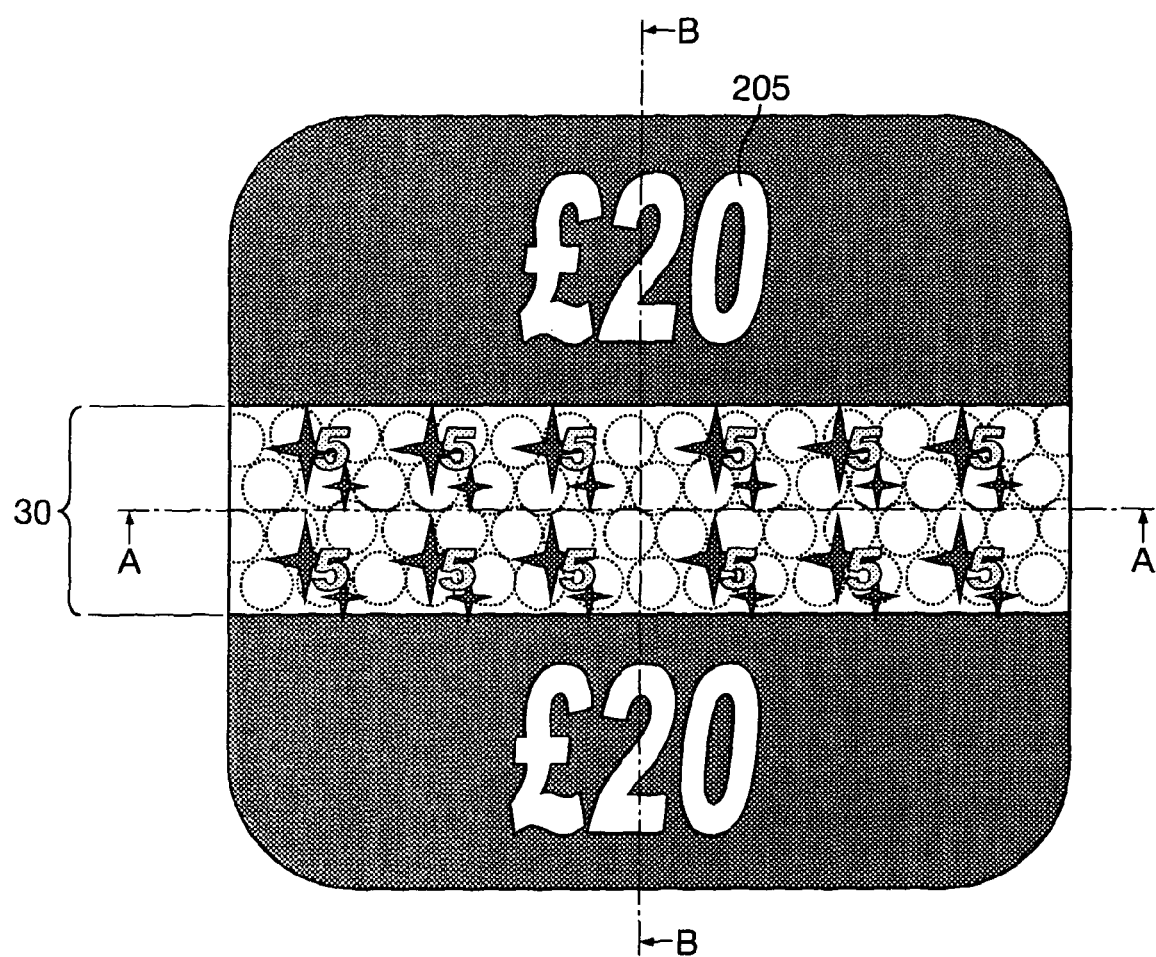
Figure 18A:
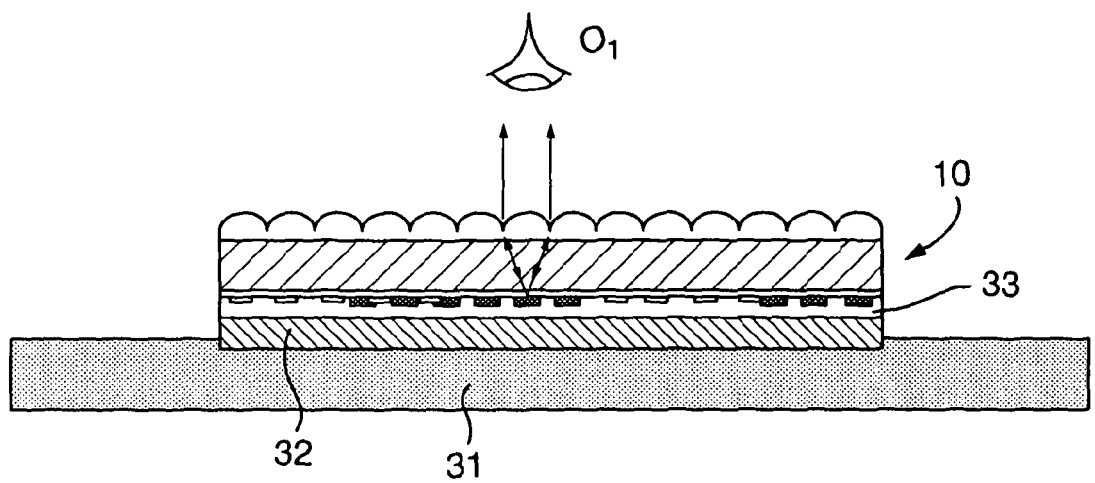
Figure 18B:
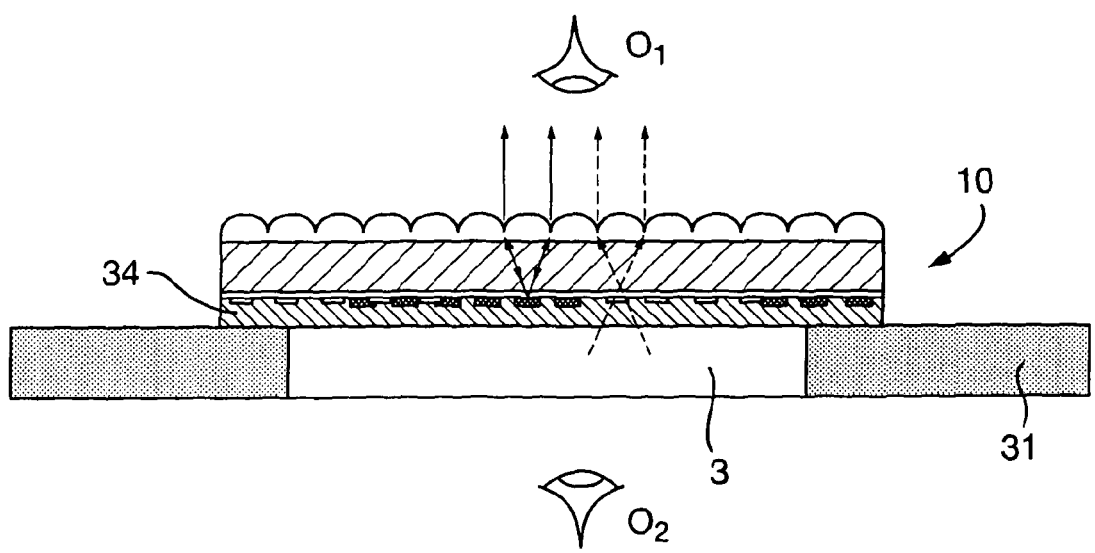

FIG. 7*a* illustrates the appearance of a third embodiment of a device in plan view, FIG. 7*b* illustrating the appearance of its first image surface alone, and FIG. 7*c* illustrating the appearance of its second image surface alone;

FIG. 8 is a cross section of the device of FIG. 7*a*, illustrating the two resulting image surfaces;

FIG. 9 is a cross section of a fourth embodiment of a device, illustrating its image surface;

FIG. 10 is a cross section of a fifth embodiment of a device, illustrating its image surface;

FIG. 11 illustrates in cross-section a schematic view of a reflective based security device of a sixth embodiment;

FIGS. 12a and 12b illustrate schematically two examples of apparatus for printing part of a security device shown in FIGS. 1-11;

FIGS. 13A-13J illustrate different types of relief microimages;

FIGS. 14 to 16 are views of other examples of moiré magnification security devices combined with holographic security devices;

FIGS. 17a and 17b are sections along lines A-A and B-B respectively in FIG. 16; and FIGS. 18a and 18b show examples of articles carrying a security device, in cross section.

Figure 1:
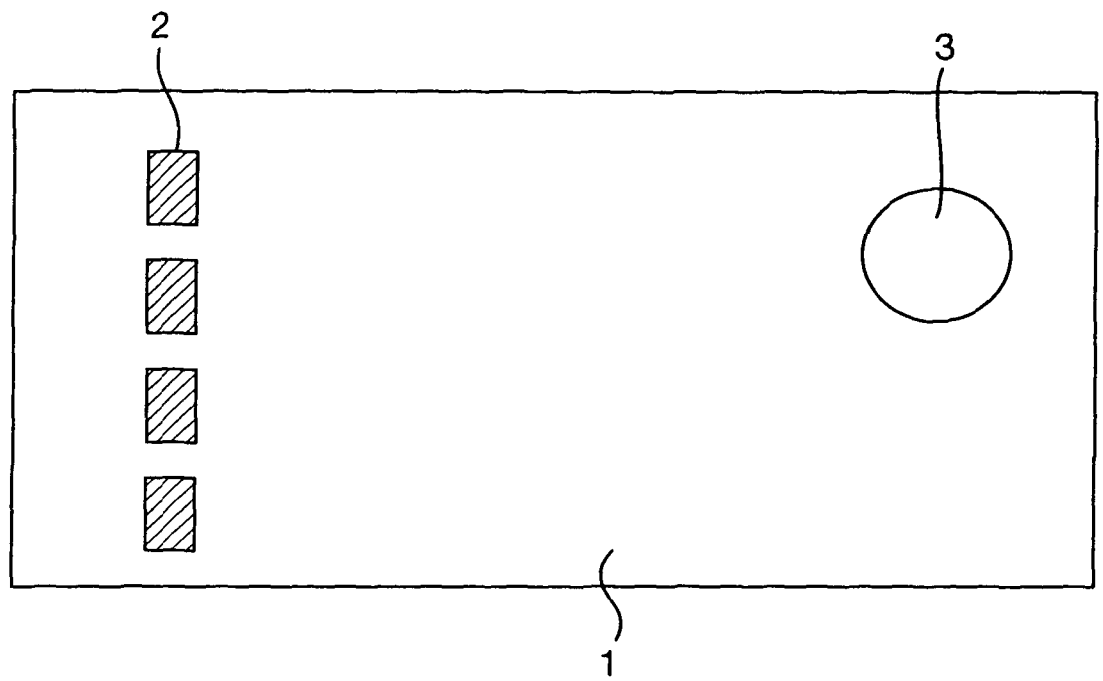
FIG. 1 is a schematic plan view of a banknote.
Figure 2:
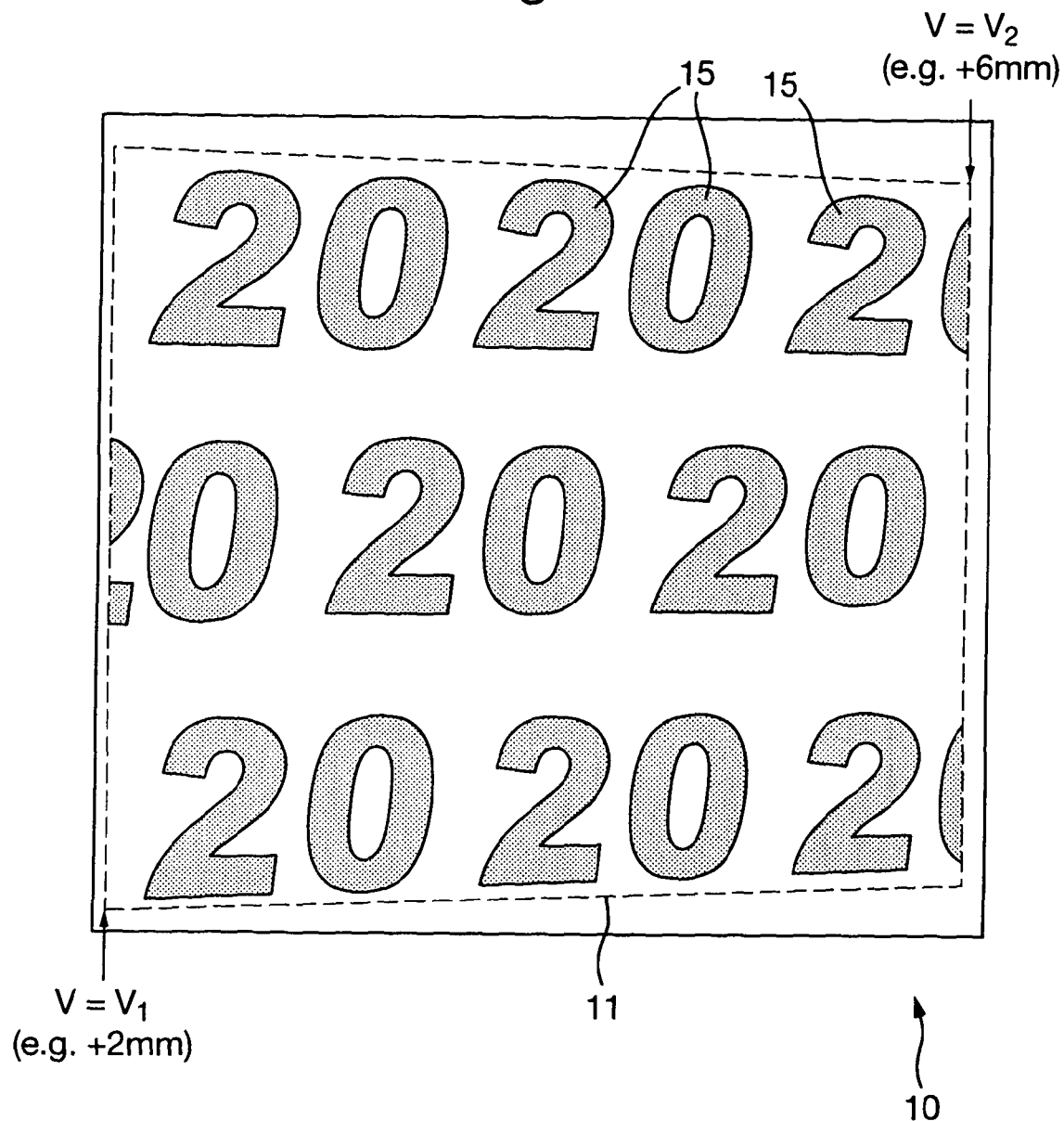
FIG. 2 illustrates the appearance of a first embodiment of a device in plan view.

FIG. 1 illustrates schematically a banknote 1 having a security thread 2 exposed at windows and a further transparent window 3. The banknote 1 may be made of paper or polymer (such as bi-axially oriented polypropylene) and one or both of the security thread 2 and window 3 incorporates a security device according to the invention. FIG. 2 shows the appearance of a first embodiment of a device 10, in plan view. In the Figure, the solid rectangular outline represents the perimeter of the device itself. The viewer perceives a magnified image 15 (sometimes referred to as the "synthetically magnified image(s)"), here comprising a repeating pattern made up of the number "20". To the viewer, the magnified image 15 appears tilted relative to the device plane. To emphasise this in the drawing, the magnified images are enclosed by a highly perspectivised rectangle shown in broken lines (although in practice this will not be visible), representing the image plane 11. The longer vertical side of the rectangle represents that part of the image plane closer to the observer, whilst the shorter vertical side corresponds to that part of the image plane further from the viewer.

In one example, at the left hand side of the device (as orientated in FIG. 2) the image plane 11 appears 2 mm behind the surface plane of the device, whereas on the right hand side of the device the image plane appears 6 mm behind the plane of the device. As will be explained further below, this is achieved by designing or fabricating the right hand side of image plane to exhibit three times the parallax motion (relative to the surface plane) exhibited by the left hand side of the image. In doing so, the illusion is created of being located at a distance behind the surface plane three times that of the left hand side. The rate of parallax motion determines the absolute image depth.

Figure 3:
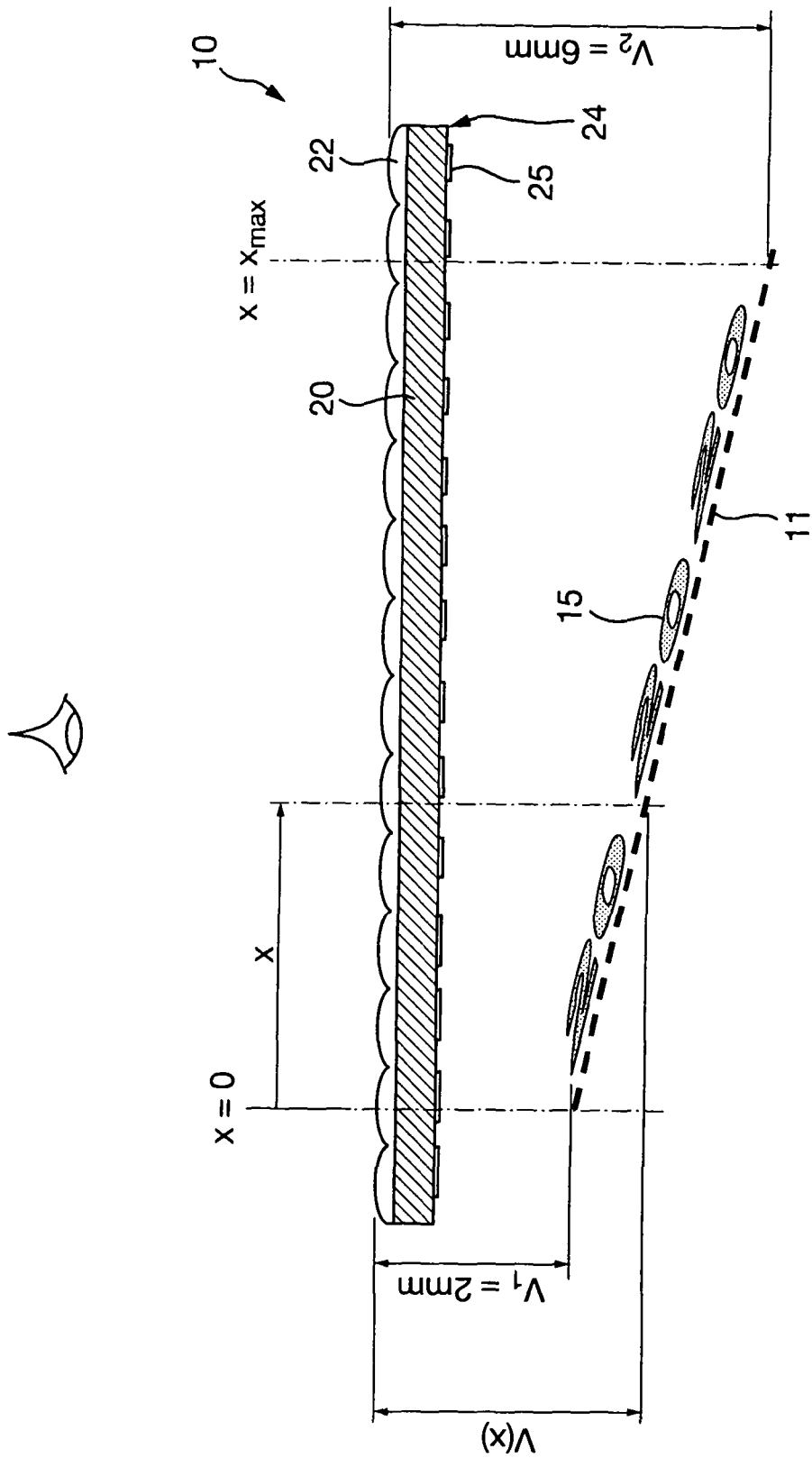
FIG. 3 is a cross section of the device of FIG. 2, illustrating the resulting image surface.

FIG. 3 illustrates in cross-section the overall structure of the device shown in FIG. 2. Thus, the device comprises a transparent, PET or other polymer layer 20 on the upper surface of which is formed a two-dimensional array of spherical microlenses 22. The diameters of the microlenses 22 is typically in the range 1-100 microns, preferably 1-50 microns and even more preferably 10-30 microns, thus defining pitches in a similar range.

Figure 4:
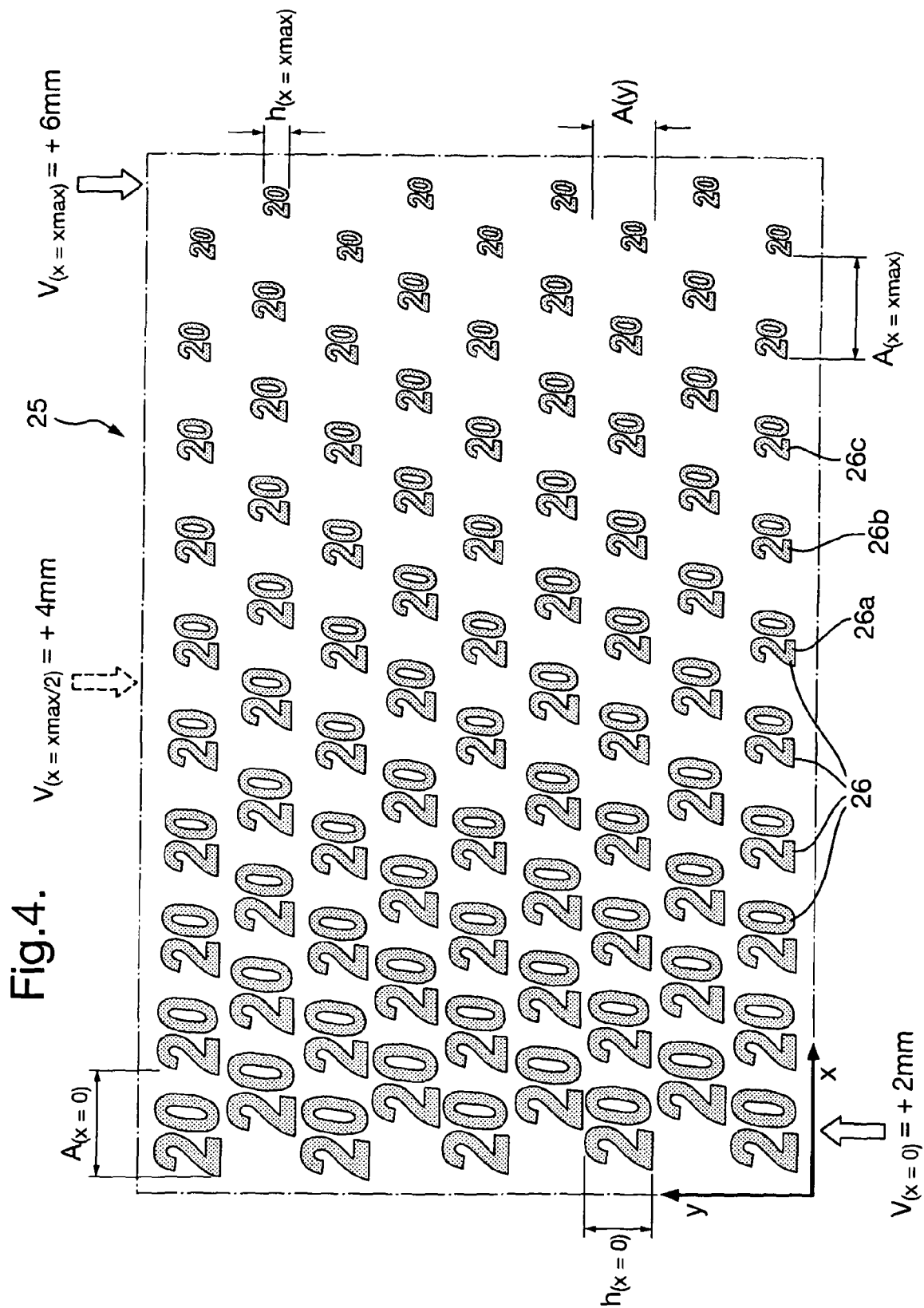
FIG. 4 shows an example of a microimage array which may be used in the construction of the FIG. 1 device.

The focal length of the microlenses 22 (as measured from their planar back surface) is substantially equal to the thickness t of the optical spacer layer which in this example comprises the thickness of the substrate 20 but could optionally include the thickness of a print receptive layer (not shown) provided on the opposite surface of the substrate 20 to the microlens array 22. Thus, in this example, a focal plane 24 is defined which is substantially co-incident with the surface of the substrate 20. On the substrate 20 is printed (or otherwise formed) a microimage array 25, an example of which is depicted in FIG. 4. The microimage array generally comprises an array of the icon, symbol, pattern or other graphic which it is desired to display with the device, reproduced with much lower dimensions than will ultimately appear to the viewer.

In order to create the phenomena of moiré magnification and enable the generation of magnified images, a pitch mismatch is introduced between the microimage array 25 and the microlens array 22. One method for producing magnification is to have a microlens and microimage array with substantially the same pitch where the pitch mismatch is achieved by introducing a small rotational misalignment between the microimage and microlens array. The degree of rotational misalignment between the microimage and microlens array is preferably in the range 15°-0.05°, which results in a magnification range of between ~4×-1000× for the microimage array. More preferably the rotational misalignment is in the range 2°-0.1°, which results in a magnification range of between ~25×-500× for the microimage array.

Alternatively, magnification can be produced by the microimage array and microlens array are in substantially perfect rotational alignment but with a small pitch mismatch. A small pitch mismatch would equate to a percentage increase/decrease of the pitch of the microimage array relative to the microlens array in the range 25%-0.1%, which results in a magnification range of between ~4×-1000× for the microimage array. More preferably the percentage increase/decrease of the pitch of the microimage array relative to the microlens array is in the range 4%-0.2%, which results in a magnification range of between ~25×-500× for the microimage array.

It is also possible to use a combination of a small pitch mismatch and a small rotational misalignment to create the phenomena of moiré magnification and enable the generation of moving images.

The result of the pitch mismatch between the array 25 and the spherical lens array 22 causes moiré magnification of the microimages. If the pitch mismatch is constant across the array, the magnified images will appear to the viewer to be located on a flat image plane which is parallel to the device surface. However, in the present embodiment, the pitch mismatch is not constant but rather is arranged to continuously vary along one axis (here, the x-axis) across at least a region of the device (in this example, the variation occurs across the whole device depicted). This can be achieved either by continuously varying the pitch of the microlens array 22, or by continuously varying the pitch of the micro-image array 25, or both. In the present example, the pitch of the microlens array 22 is substantially constant, and that of the microimage array 25 is varied as will now be demonstrated.

The degree of magnification achieved by moiré magnification is defined by the expressions derived in "The Moire magnifier", M. Hutley, R Hunt, R Stevens & P Savander, Pure Appl. Opt. 3 (1994) pp. 133-142.

To summarise the pertinent parts of this expression, suppose the micro image pitch=A and the micro lens pitch=B, then magnification M is given by:

$$M = A/\sqrt{(B\cos(\Theta)-A)^2 - (B\sin(\Theta))^2}$$

where, Theta equals angle of rotation between the 2 arrays.

For the case where A≠B and where Theta is very small such that $\cos(\Theta) \approx 1$ and $\sin(\Theta) \approx 0$:

$$M = A/(B-A) = S/(1-S) \quad (1)$$

Where S=B/A

However for large M>>10 then S must≈unity and thus $$M \approx 1/(1-S)$$

The "depth" of the synthetic image relative to the surface plane derives from the familiar lens equation relating magnification of an image located a distance V from the plane of lens of focal length f. This being $$M = V/f - 1 \quad (2)$$

Or, since typically v/f>>1

$$M \approx V/f$$

Thus the depth V of the synthetically magnified image=M*f.

Suppose the structure of FIGS. 2 and 3 was comprised of micro lenses 22 with a focal length f of 40 μm or 0.04 mm. Furthermore let us suppose both the micro lenses and the supporting substrate 20 where both comprised of materials with refractive index n of 1.5. Then it follows that the base diameter D of the lenses will constrained by the expression $$D \leq f * 2(n-1)$$

and therefore $$D \leq 0.04 * 2(1.5-1)$$

giving $$D \leq 0.04 \text{ mm}.$$

We might then choose a value for D of 0.035 mm and a lens pitch B of 0.04 mm (along each of the x and y axes), resulting in a lens array with a f/# number close to unity with reasonable close packing (inter lens gap 5 um).

By controlling the pitch of the microimage elements, the magnification level and depth of the resulting image can be controlled. Considering first, for comparison, the case of a flat image plane parallel to the device surface: in a first example, suppose we require the image plane to be located 2 mm behind the surface plane of the substrate 20 (note images behind the surface plane are by definition "virtual" and a more detailed analysis shows them to be non-inverted relative to the micro image object array 25).

For further illustrative simplicity we assume in this illustration that the pitch of the microimage elements is the same along the x and y axes (i.e. $Ay_1 = Ax_1$).

Given M=v/f, then it follows if f=0.04 mm and v=2 mm, then $M_1 = 2/0.04 = 50$.

Therefore since $M_1 = A_1/(B-A_1) = 50$, it follows 50 $(B-A_1) = A_1$, giving $A_1 = B(50/51)$ Substituting B=0.04 mm, we obtain $A_1 = 0.0392$ mm.

In a second example, suppose we wish to obtain a flat image plane 6 mm behind the plane of the device. Now, $M_2 = 6/0.04 = 150$ and thus $150(B-A_2) = A_2$, giving $A_2 = B(150/151) = 0.0397$ mm.

So it can be seen that different image plane "depths" (V) can be achieved through the use of different microimage array pitches (A).

Therefore, to achieve tilt or curvature of the image plane, the perceived depth can be made to change between one position on the device and another by continuously varying the microimage array pitch (A) across the device. Above, we have denoted the distance or depth of the image plane relative to the surface plane by the symbol V (the value of V for a particular image plane being constant across the surface of the device). However in the present embodiment, the value of V varies with distance x from the left hand edge of the device. Therefore, V is a function of x and thus it is pertinent to write that V=V(x). In other embodiments, the depth V could additionally or alternatively vary in the y-axis direction, so more generally, V=V(x,y).

In the present embodiment, as shown in FIG. 3, the desired image plane 11 is flat and titled at an angle to the device surface, with its left-most side (x=0) appearing at a depth $V_1 = 2$ mm behind the device surface, and its right-most side ($x = x_{max}$) at a depth $V_2 = 6$ mm behind the device surface. Taking the device surface as V=0, for simplicity, and applying the straight line equation:

$$V(x) = kx + C \quad (3)$$

where k and C are constants, we can substitute the known values at x=0 and $x = x_{max}$, and, rearranging, write:

$$(V(x)-2)/x = (6-2)/x_{max}$$

Therefore for a particular value of x, the value V(x) can be easily determined.

Now since the image depth V is a function of x, from equation (2) above, so therefore is the magnification M and thus the image pitch A (assuming the lens pitch B is fixed). Therefore, combining equations (1) and (2) we may write:

$$A(x) = B * [1 - f/v(x)]$$

As before if we assume in this embodiment that B=0.04 mm and f=0.04 mm, then:

$$A(x=0) = 0.04[1 - 0.04/2] = 0.0392 \text{ mm}$$

$$A(x=x_{max}) = 0.04[1 - 0.04/6] = 0.0397 \text{ mm}$$

$$A(x=x_{max}/2) = 0.04[1 - 0.04/4] = 0.0396 \text{ mm}$$

In this way, the pitch A(x) required at each location of the microimage array 25 along the x-axis in order to produce an image plane 11 of the desired tilt can be calculated. The microimage elements can then be printed or otherwise formed onto the substrate 20 at the calculated positions such that the pitch variation is incorporated into the array.

FIG. 4 shows an example of a suitable microimage element array 25 which may be used to form the device shown in FIGS. 2 and 3, illustrating a plurality of microimage elements 26. Each microimage element 26 takes the form of a numeral "20", which is essentially the same as the "20"'s in the magnified image (see FIG. 2), but typically several tens or hundreds of times smaller in dimension. The microimages could alternatively comprise a set of "2"'s and an adjacent set of "0"'s with a similar result.

At the left-hand side of the array 25, i.e x=0, the pitch $A_{(x=0)}$ between adjacent microimage elements 26 (in the x-direction) is selected to return an image depth $V_{(x=0)}$ of +2 mm. At the right-most side of the array 25, i.e. $x = x_{max}$, the pitch $A_{(x=xmax)}$ between adjacent microimage elements is selected to return a greater image depth $V_{(x=xmax)}$ of +6 mm. Between x=0 and $x = x_{max}$, the pitch A continuously varies: in this example, the pitch increases by 0.0005 mm from one side of the array to the other. Preferably, the pitch changes between each adjacent pair of elements 26—for instance, the spacing between elements 26a and 26b in FIG. 4 is slightly less than that between elements 26b and 26c. In this way, the gradual change in image plane depth will be perceived as a smooth surface to the human eye. However, in some cases the same result can be achieved if two or more adjacent pairs of elements share the same spacing.

As mentioned above, in this example, the pitch variation is only applied along the x-axis ("A(x)") but in other embodiments the pitch of the microimage element array could instead vary along the y-axis ("A(y)"), which would result in a plane appearing to tilt towards the "top" or "bottom" edge of the device rather than the left/right edges. In still further embodiments, the pitch could vary along both the x and y axes, in which case the image plane would appear to tilt in both directions.

It will be noted that, in FIG. 4, the size of the individual microimage elements 26 also changes from the left to the right of the array 25. This is not essential. If all of the microimage elements are formed at the same size, there will be distortion of the magnified image for the reasons now discussed. In some implementations this can be made use of as a visual effect in itself. However, in the present embodiment, it is desired to remove size distortion so that the magnified elements appear to have substantially the same size as each other.

To understand how the tilted magnified image is generated we first note that the perceived depth is given by the approximation:

Depth ($v$)=$M$=focal length of lens array ($f$)

where M=synthetic magnification (see equation (1) above).

It therefore follows that the micro images located at that part of the synthetic image 6 mm behind the device surface will be magnified by three times the amount experienced by those micro images located at that part of the image only 2 mm behind the surface plane. Consequently if there is to be no size distortion of the numeral '20' then it follows that the microimage elements 26 located at the 6 mm "deep" area of the image plane must be one third the size of those under the 2 mm "deep" area of the plane. That is, the height "h" of the elements 26 varies between $h_{(x=0)}$ and $h_{(x=xmax)}$ where $h_{(x=0)} = 3 \cdot h_{(x=xmax)}$.

It should also be realised that all variations in micro image size and pitch for intermediate depths can be calculated in a similar way and in particular the values for the middle of the planar synthetic image will be the mean of the values for the 2 mm and 6 mm "deep" areas of the plane. Thus, for example, h (x=xmax/2)=[h(x=0)+h(xmax)]=[3+1].h(x=xmax)/2=2h(x=xmax).

Figure 5:
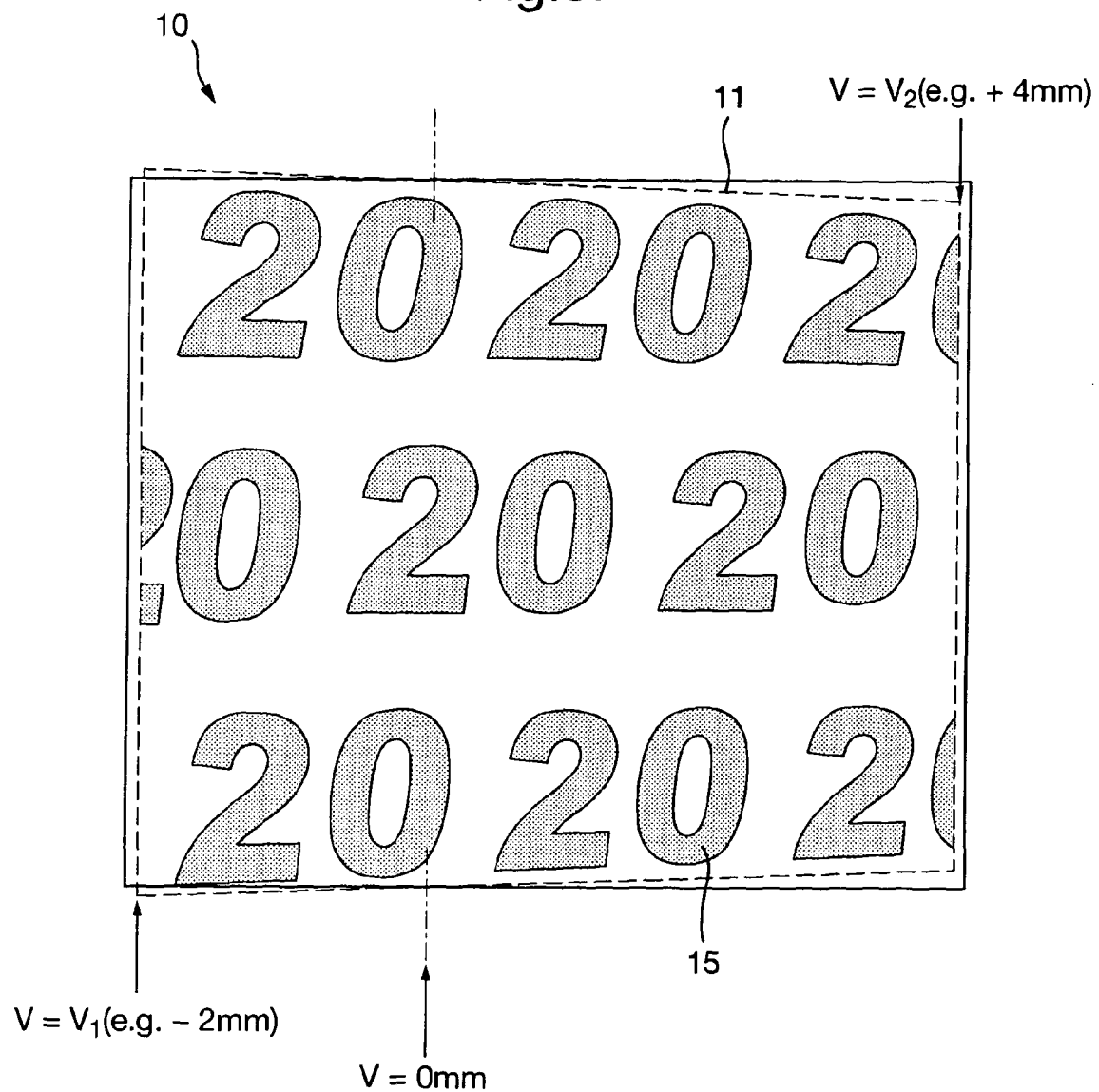
FIG. 5 illustrates the appearance of a second embodiment of a device in plan view.

A second embodiment of a device is depicted in FIGS. 5 and 6. Here, the device is formed using the same principles described with respect to the first embodiments, but the tilted image plane intersects the plane of the device surface. That is, referring to FIG. 5, the left-hand side of the image plane 11 appears to the viewer to be located above the device, and the right-hand side of the image plane 11 appears to be located below the device surface. The position at which the image plane appears to intersect the device is labelled V=0.

To illustrate this concept, consider first an example of a flat image plane parallel to the device surface and located 2 mm in front of the device, using the same exemplary values for the other parameters as before.

In contrast to the previous examples, here the magnified image of array 25 will be a real inverted image and thus the sign of the magnification will be negative (which follows from assigning a negative value for the image depth V in the previous expression for magnification).

Hence M=−2/0.04=−50 and thus −50 (B−A)=A, giving A=50/49 B=0.0408 mm.

Hence we see that for the image plane to be located in front of the surface plane (i.e appearing to float) the micro image array must have a pitch larger than the lens pitch. Conversely if the image pitch is less than the lens pitch then the image array will appear to be located below the surface plane (as in the previous examples).

Thus the image plane can be positioned in front of the device surface through control of the pitch mismatch. As such the calculations set out in relation to the first embodiment can be applied in the same way (using $V_{(x=0)} V_1 = -2$ and $V_{(x=xmax)} = V_2 = +4$ for example) to determine appropriate pitch variations with which the array of micro-images should be formed in order to arrive at the image surface shown in FIGS. 5 and 6. For example, V(x=xmax/2)=(−2+4)/2=1 mm $A(x=0)=0.04[1+0.04/2]=0.0408$ mm $A(x=xmax)=0.04[1-0.04/4]=0.0396$ mm $A(x=xmax/2)=0.04 [1-0.04/1]=0.0384$ mm FIGS. 7 and 8 illustrate a third embodiment of a device in which two or more overlapping image planes are generated in the same region of the device. This can be particularly advantageous where a multicoloured device is desired, since each image plane arises from its own respective microimage element array. As such, the two microimage element arrays can be formed in different colours since they do not need to be in registration with one another. However, this is not essential and the two arrays could be of the same colour if desired.

FIG. 7a illustrates the appearance of the complete device in plan view. Two sets of magnified images are visible, one overlying the other. A first set of magnified images, here "star" symbols 15 appear to lie on a tilted first image plane 11. This first image plane 11 is shown on its own in FIG. 7b. Over the star symbols, a second set of magnified images 150, here the numeral "5" appears on a flat second image plane 110, parallel to the device surface (in FIG. 7a, the periphery of second image plane 110 therefore coincides with that of the device itself, and is not visible). FIG. 7c shows the second image plane 110 alone. In combination, since one set of images appears to lie "above" the other, when the device is tilted, there will appear to be relative movement between the "stars" and the "5"'s.

Thus the first, tilted, image plane 11 is formed using the same principles as described above with respect to the first and second embodiments. Namely, a first array of microimage elements 25 is formed on the substrate 20 (see FIG. 8), with the pitch of the elements incorporating a continuous variation in at least one axis, as previously described. The second image plane 110 is formed by applying a second array of microimage elements 250 to the same surface of the substrate 20. However, since in this example the second image plane is to be parallel to the device surface, the pitch of the second microimage element array 250 is kept constant across the array. In practice, if the first image plane 11 will be perceived as lying behind the second image plane 110 (as in the present example), the second microimage element array may be applied to the substrate before the first microimage element array such that the elements of the second microimage element array are not obscured by those of the first. Of course, the first image plane could alternatively be arranged to appear in front of the second, in which case the order of laying down the microimage element arrays may be reversed.

It will be appreciated that the second image plane 110 could, alternatively, also be tilted or curved using the same principles applied to the generation of the first image plane 11. For example, both planes could be arranged to appear tilted to the same angle, spaced from but parallel to each other. Alternatively, the two planes could be tilted at different angles and could converge or diverge from one another. The two planes may also intersect one another and/or the device surface. An example of an intersecting embodiment will be described below.

Three or more image planes could be provided by providing three or more corresponding microimage element arrays in a corresponding manner.

As already alluded to, the image surfaces generated using the presently-disclosed principles need not be planar but could instead be curved. FIG. 9 illustrates a fourth embodiment of the invention in which the generated image surface is curved. Again, this is achieved by varying the pitch of the micro-image element array 25 (and/or that of the microlens array 22) at least along the x-axis. In this case, instead of using the straight line equation (3) as in the embodiments above, the desired depth variation V(x) can be defined as a curve. Examples include curves defined by circular, elliptical, parabolic or other forms of polynomial function and those defined by forms of trigonometric function. In one particularly effective implementation, the image plane could be configured to curve in both the x and y axis, giving the device the appearance of a 3D spheroidal surface on which the magnified images are presented.

Curved image surfaces such as that shown in FIG. 9 can be combined with one or more other flat, tilted or curved image surfaces to achieve a superposition of image surfaces as described with respect to FIGS. 7 and 8.

In the above embodiments, the pitch mismatch variation has been applied across one region of the device which generally encompasses the whole device. However, additional effects can be achieved by designating different laterally spaced (but preferably abutting) regions of the device to have different variations in the pitch mismatch and hence display different image surfaces to the viewer. In one example, the pitch mismatch variation could be restricted to a portion of the device, such that the image surface only appears tilted or curved in that region, and in the surrounding areas it appears flat and parallel to the device surface. However, more complex structures can yield interesting effects such as that depicted in FIG. 10 as a fifth embodiment of the invention. Here, in a first region $R_1$ of the device, the image plane 11 a is configured to tilt away from the viewer—i.e. the depth V increases with distance x. In a second region $R_2$, the image plane 11b is configured to tilt towards the viewer—i.e. the depth V decreases with distance x. The two regions abut one another at x=x*, and the image planes 11a and 11b are arranged to intersect one another at the same position. The result is a "chevron" shaped image plane 11 (made up of regions 11a and 11b) which appears as a "valley" to the viewer. Of course, the arrangement of the two regions could be reversed so as to appear as a "hill". By arranging for the tilt or curvature to take place along the y-axis direction as well as in the x-axis, the complexity of the surface can be further increased.

The present invention is not limited to any specific type or geometry of microlens, the only requirement being that the microlens can be used to form an image. Microlenses suitable for the present invention include those that refract light at a suitably curved surface of a homogenous material such as plano-convex lenslets, double convex lenslets, and fresnel lenses. Preferably the present invention will comprise spherical microlenses but lenses of any symmetry including cylindrical lenses could be employed. Both spherical and aspherical surfaces are applicable to the present invention. It is not essential for the microlenses to have a curved surface. Gradient refractive index (GRIN) lenses image light by a gradual refraction throughout the bulk of the material as a result of small variations in refractive index. Microlenses, based on diffraction, such as Fresnel zone plates can also be used. GRIN lenses and amplitude or mask based fresnel zone plates enable the surface containing the microlens array to be planar and offers advantage in print receptivity and durability.

It is preferable to use a periodic array of lenses generated by a replication process. Master microlens arrays can be produced by number of techniques such as photothermal techniques, melt and reflow of photoresist and photoresist sculpture. Such techniques are known to those skilled in the art and are detailed in chapter 5 of "Micro-Optics: Elements, Systems, and Applications" edited by Hans Peter Herzig, published by Taylor and Francis, reprinted 1998. The master microlens structure can then be physically copied by commercially available replication techniques such as hot embossing, moulding or casting. Materials into which the microlens structures can be replicated include but are not limited to thermoplastic polymers such as polycarbonate and polymethylmethacrylate (PMMA) for the hot embossing and moulding processes and acrylated epoxy materials curable by heat or radiation for the casting process. In a preferred process the microlens array is replicated via casting into a UV curable coating applied to a carrier polymer film such as PET.

For simplicity, the examples and embodiments herein describe the use of spherical microlenses.

As an alternative, the security device of any of the embodiments could be fabricated as a mirror-based moiré device, of which an example is shown in FIG. 11. In this case, the spherical microlens array 22 is replaced by a spherical or aspheric concave mirror array 40 formed on one surface of the transparent polymer substrate 20. The other surface is provided with one or more microimage element arrays 25, 250 as before. In this particular example, the microimage elements are printed onto a print receptive layer 23 provided on the substrate 20. In each of the embodiments, the microlens array 22 or concave mirror array 4 can be integrally moulded into the polymer substrate 20 or could be formed on the surface of the substrate 20, for example by cast-curing or the like.

The ray diagram included in FIG. 11 shows how the mirror array 40 reflects ambient light passing through the microimage element array(s) and presents a magnified version of the underside of the array(s) to the viewer. The effect is the same as that perceived using micro-lens based embodiments, and the resulting image plane(s) can again lie above or below the device surface. To achieve tilting or curvature of the image plane(s), the microimage element array(s) and/or the mirror array is arranged to vary in pitch along at least one axis using the same principles discussed above.

In this example, two microimage element arrays 25, 250 are provided. The first microimage element array 25 is configured to present to the viewer an image plane 11 which is tilted up towards the right hand side of the Figure. The second microimage array 250 is configured to present an image plane 110 which is tiled in the opposite direction and intersects the first image plane 11. Thus, in the left portion of the device, the first image plane will appear behind the second and this order will be reversed on the right hand side.

In the example shown, the first microimage element array 25 is depicted as having been applied to the print receptive layer 21 first, then followed by the application of the second micro image array 250. This will ensure that the reflective image pertaining to the first image plane is visualised as being in front of the second plane of micro images on the right hand side of the image. However, on the left hand side of the image the order of laying down the microimage elements may need to be reversed to avoid confusion in the image.

Since, in this embodiment, the incident light has to pass through or be transmitted by the printed micro image arrays 25, 250 (i.e. spatially modulated) before being reflected back as collimated light by the mirror array, then it follows that if the print micro images are substantially opaque the synthetically magnified images will take on a blackish colour or hue against the metallic hue provided by the mirror background. For the synthetically magnified images to appear with the colour of their corresponding micro image array then it is necessary that the micro images are at least partially translucent. The more translucent the micro images the brighter the colour of the synthetic images—however at a cost of reduced image contrast relative to the background.

If the metal coating on the mirrors is 'white' reflector such as Aluminium then the background hue or colour surrounding the synthetic images will be silver-white or achromat in appearance. However it should be recognised that other affordable coloured metals such as Copper or it alloys may be used. Other metals such as Silver, Gold, Platinum, Chrome, Nickel, Nickel-Chrome, Palladium, Tin etc may be used where there.

It should be noted that the focal length of a concave mirror is equal to half its radius of curvature R and therefore can have a limiting minimum value approaching one quarter of the mirror base diameter. In simple terms, for a given base diameter the focal length and F number of a mirror can be one quarter of the value of equivalent lens (assuming typical refractive index of 1.5). However as reducing F number equates to reducing depth of focus, then in practice it will often be desirable to have a mirror base diameter much less than 2R.

For example considering the preferred device thicknesses cited earlier we may require the mirror focal length to be 40 um—then this requires the mirror radius R to have a value 80 um and thus a maximum theoretical base diameter approaching 160 um and thus an F number f/#=0.25 mm. This structure is intended for viewing only in reflection mode and thus is most relevant for application onto opaque substrates (strip & patch) or partially embedding into opaque substrates (windowed thread). As per the lens system the printed micro images must be coincident with the focal plane of the mirrors to a precision determined by the depth of focus or field of the mirror system. Other possibilities for lens-based systems will be discussed below with reference to FIG. 18.

FIG. 12a illustrates part of suitable apparatus for printing the micro image elements onto the substrate 20. The apparatus shown in FIG. 12 comprises an inking roll 70 coupled via a roll chain 72 to an ink reservoir 74. Ink is transferred by the roll 70 onto a print roll 76 carrying proud printing elements 78 corresponding to the microimage elements of the array concerned. The substrate 20 is fed between the print roll 56 and an impression roller 80 and the image elements are printed onto the substrate 20.

A second apparatus similar to that shown in FIG. 12a may be provided downstream of that apparatus to print a second array of microimage elements if desired.

FIG. 12b illustrates alternative apparatus suitable for printing the image elements. Ink is transferred by the roll 70 onto a print roll 82 carrying recessed printing elements 83 corresponding to the microimage elements of the array concerned. A doctoring blade 84 contacts and removes ink or colorant off the non-recessed areas of the print roller 82. The substrate 20 is fed between the printing roller 82 and an impression roller 80 and the image elements are printed onto the substrate. A second apparatus similar to that shown in FIG. 12b may be provided downstream of that apparatus to print another array of image elements if desired.

Microlenses or concave micromirrors are provided on the opposite surface of the substrate 20 by cast-curing, moulding or the like.

In the examples described above, the microimage elements have been provided by printing onto the substrate. It would also be possible to provide some or all of the image elements as relief structures and examples of some of these are shown in FIGS. 13A-13J. In these Figures, 'IM' indicates the parts of the relief generating an image while 'NI' indicates those parts which do not generate an image.

Figure 13:
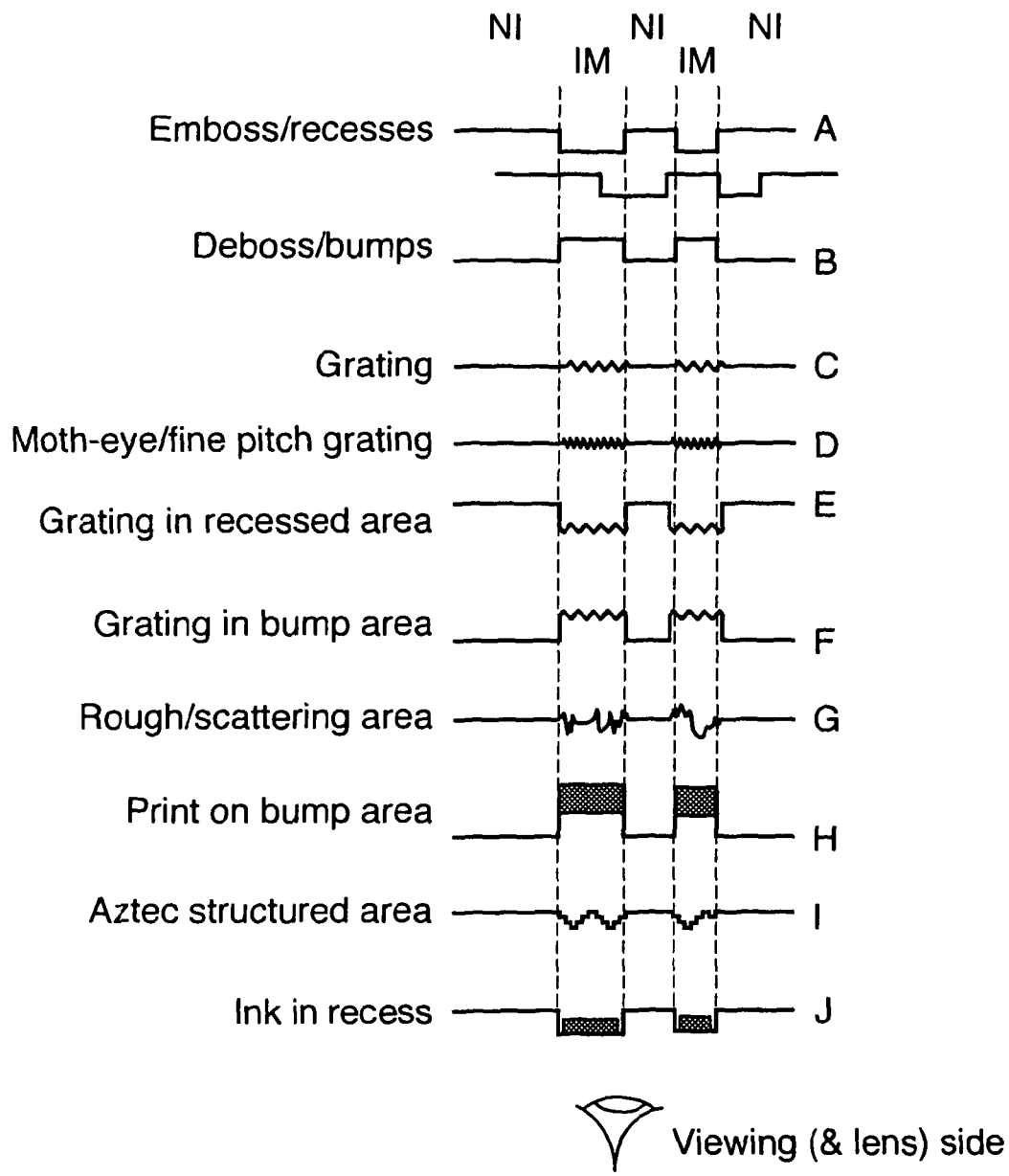

FIG. 13A illustrates embossed or recessed image elements. FIG. 13B illustrates debossed image elements. FIG. 13C illustrates image elements in the form of grating structures while FIG. 13D illustrates moth-eye or other fine pitch grating structures.

These structures can be combined. For example, FIG. 13E illustrates image elements formed by gratings in recesses areas while FIG. 13F illustrates gratings on debossed areas.

FIG. 13G illustrates the use of a rough embossing.

FIG. 13H illustrates the provision of print on an embossed area while

FIG. 13I illustrates "Aztec" shaped structures.

FIG. 13J illustrates ink filled recesses.

The various embodiments of the device construction described above can be slit or cut into patches, foils, stripes, strips or threads for incorporation into plastic or paper substrates in accordance with known methods.

In one embodiment the current invention could be incorporated into a security paper as a windowed thread.

In further examples, the security device also includes one or more other optical security features. An example of this is shown in FIG. 14. In this example, a moiré magnifier device 30 is formed as described with reference to any of the above-described embodiments. The security device also includes a number of holographic image generating structures 100. The holographic image structures 100 can be cast or embossed into the same resin as the microlenses but equally two different resins, one suitable for casting the microlenses and one suitable for embossing a holographic structure could be applied in register. Alternatively the holographic structures could be embossed into a polymeric lacquer positioned on the opposite side of the polymeric layer to the microlenses.

The holographic generating structures 100 can be in the form of holograms or DOVID image elements. In the label construction shown in FIG. 14, the microlenses and the visualisation of the magnified image array(s) is located in a central horizontal band or region of the label whilst the holographic generating structures 100 are located on either side. However, it should be understood that this example is purely illustrative and for example the holographic generating structures 100 could be located in a central band or strip with the moiré magnifier 30 being provided in one or more regions on either side. Alternatively moiré magnified images and the image provided by the holographic generating structures could be integrated into a single image by each providing components of a single image. FIG. 15 illustrates an example of such an integrated design where the holographic generating structures 101 form a scroll and in the middle of the scroll the holographic structures are replaced with a moiré magnifier 30 to create a moiré magnified image in this case of moving "5"'s and stars (e.g. as described with respect to FIG. 7 above).

In the case of the holographic structures 100, 101 these can have any conventional form and can be fully or partially metallised. Alternatively the reflection enhancing metallised layer can be replaced with a substantially transparent inorganic high refractive index layer, such as ZnS.

Whatever arrangement is defined, it is advantageous if the individual regions allocated to the two different optical effects in FIGS. 14 and 15 are sufficiently large to facilitate clear visualisation of the effects.

The security devices shown in the previous figures are suitable to be applied as labels to secure documents which will typically require the application of a heat or pressure sensitive adhesive to the outer surface of the device which will contact the secure document. In addition an optional protective coating/varnish could be applied to the exposed outer surface of the device. The function of the protective coating/varnish is to increase the durability of the device during transfer onto the security substrate and in circulation.

In the case of a transfer element rather than a label the security device is preferably prefabricated on a carrier substrate and transferred to the substrate in a subsequent working step. The security device can be applied to the document using an adhesive layer. The adhesive layer is applied either to the security device or the surface of the secure document to which the device is to be applied. After transfer the carrier strip can be removed leaving the security device as the exposed layer or alternatively the carrier layer can remain as part of the structure acting as an outer protective layer. A suitable method for transferring security devices based on cast cure devices comprising micro-optical structures is described in EP1897700, The security device of the current invention can also be incorporated as a security strip or thread. Security threads are now present in many of the world's currencies as well as vouchers, passports, travelers' cheques and other documents. In many cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6 mm, are particularly useful as the additional exposed area allows for better use of optically variable devices such as the current invention. The device structures shown in any of the Figures could be used as a thread by the application of a layer of transparent colourless adhesive to one or both of the outer surfaces of the device. Careful selection of the optical properties of the adhesive in contact with the microlenses is important. The adhesive must have a lower refractive index than the microlens material and the greater the difference in the refractive index between the microlenses and the adhesive the shorter the back focal length of the lenses and therefore the thinner the final security device.

The security device of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Additional optically variable materials can be included in the security device such as thin film interference elements, liquid crystal material and photonic crystal materials. Such materials may be in the form of filmic layers or as pigmented materials suitable for application by printing.

The security device of the current invention may comprise an opaque layer.

FIGS. 16 and 17 shows a further security feature in the form of a demetallised image incorporated within a security device of the current invention. The magnified image arrays of the device 30 are observed in the central band of the device. This provides a primary security effect due to the strong lenticular type animation. As can be seen in FIG. 17, the structure of the feature shown in FIG. 16 along section A-A is as shown in FIG. 8. In the regions outside of the central band exhibiting moiré magnification (as seen along section B-B) the print receptive layer 21 has been metallised 200. Parts 205 of the metal layer are demetallised to define the demetallised images thus enabling the creation of demetallised indicia which can be viewed in reflective but more preferably transmitted light.

In a further example and in reference to the mirror-based moiré example shown in FIG. 11 the metallised layer forming the micromirrors may be extended beyond the micromirrors and then parts of this layer can be demetallised to define demetallised images.

One way to produce partially metallised/demetallised films in which no metal is present in controlled and clearly defined areas, is to selectively demetallise regions using a resist and etch technique such as is described in U.S. Pat. No. 4,652, 015. Other techniques for achieving similar effects are for example aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart.

The presence of a metallic layer can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

FIGS. 18a and 18b show two schematic figures, illustrating how lens based moiré systems would operate in reflection only mode and in both reflection and transmission respectively. FIG. 18a shows the reflection only scenario where the device 10 having a similar structure to that of FIG. 8 is either applied onto a substantially opaque substrate 31 (e.g. a banknote or other security document) or partially embedded into an opaque substrate (e.g. as a windowed thread) via an adhesive layer 32. In this case the synthetically magnified image viewed by the observer is ultimately derived from light that has been back scattered or reflected from the micro image arrays 25, 250 and the medium that acts as a background to the micro-image array. The greater the reflective contrast between the micro image arrays and the surrounding back ground medium the greater the visual contrast of the synthetically magnified images. Now it may be that the colour or reflective properties of the substrate 31 are non optimal—for example the substrate may be of low reflectivity or a similar colour to one of the micro image arrays. To address this we show in FIG. 18a the addition of an optional mask coat layer 33 located between the micro print interface and the adhesive layer 32 bonding to the device to the substrate 31. The mask layer 33 will typically contain a reflective opacifying pigment such as, but not limited to, titanium dioxide particles in a resin binder. The colour of this layer could be simply white or a colorant could be added to ensure that this mask layer or background reflecting layer exhibits a desired hue which contrasts with one or both micro image arrays.

In a further example the mask coat and one of the micro image arrays have overtly the same color, however one or other entity has been provided with a metameric property.

Consequently under normal viewing the relevant micro image array is only weakly discerned (if at all) against the background colour of the opaque mask—however when viewed under a metameric filter said micro image array or more pertinently its synthetically magnified image becomes strongly evident. Alternatively the mask coat may be provided with a fluorescent additive such that when viewed under a fluorescent light the mask coat provides a fluorescent background against which the absorbing micro image arrays form black synthetically magnified images. Examples of metameric inks are provided in GB1407065. The mask coat may also function as a durability enhancing layer.

FIG. 18b shows the scenario where the device 10 is applied at least partially over a transparent aperture 3 within the substrate 31. It is well known to incorporate security devices into transparent apertures within secure documents (see below). In this case the synthetically magnified image may be viewed in reflection and/or transmission through the viewing aperture 3 in the substrate 31. The observer will only see magnified image when located in position #1. As can be seen in FIG. 18b, the opaque mask coat is omitted so we can observe the moiré magnification system in transmission. It is also a requirement that the adhesive layer 34 have good optical clarity (i.e. low scatter low absorption)

It should be note that if the printed micro-images 25, 250 are formed from an ink or colorant that is substantially opaque, then the synthetically magnified image will be coloured when viewed in reflection, but will form a high contrast essentially black image when viewed in transmission.

A requirement for a coloured image to be viewed in transmission is that the micro images must have some degree of translucency. Light must be able to pass through the printed images and the desired colour transmitted.

Note also that if the observer views the device from location #2, then no synthetically/moiré magnified image is observed, but instead an unmodified or direct image of the micro image patterns.

The substrate 31 may form part of a security document and may itself be formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519, EP1398174 and WO03054297.

One or more of the disclosed microimage arrays may be printed with inks comprising materials that respond visibly to invisible radiation. Luminescent materials are known to those skilled in the art to include materials having fluorescent or phosphorescent properties. It is also well known to use other materials that respond visibly to invisible radiation such as photochromic materials and thermochromic materials. For example only one of the magnified arrays might be visible in normal daylight conditions with the second magnified image becoming visible only under UV illumination. Alternatively the two magnified arrays could appear the same colour in normal daylight conditions and different colours when viewed using a filter or when viewed under UV illumination.

The invention claimed is:

1. A moiré magnification device comprising a transparent substrate carrying:
   i) a regular array of micro-focusing elements on a first surface, the focusing elements defining a focal plane; and
   ii) a corresponding first array of microimage elements located in a plane substantially coincident with the focal plane of the focusing elements,
   wherein the pitches of the micro-focusing elements and the array of microimage elements and their relative locations are such that the array of micro-focusing elements cooperates with the array of microimage elements to generate magnified version of the microimage elements due to the moiré effect,
   and wherein, along at least one axis across at least a first region of the device, the pitch between the microimage elements and/or between the micro-focusing elements continuously varies across the respective array(s), whereby the moiré effect causes different degrees of magnification of the image elements to occur, such that the viewer perceives that the magnified elements are located on a first image surface which is tilted or curved relative to the surface of the device.

2. The device according to claim 1, wherein in the first region of the device, the pitch between the microimage elements and/or between the micro-focusing elements continuously varies in the same sense.

3. The device according to claim 1, wherein in the first region of the device the pitch between the microimage elements and/or between the micro-focusing elements continuously varies in both orthogonal axes of the respective array(s).

4. The device according to claim 1, wherein in the first region of the device, the size of the microimage elements varies in a corresponding manner such that the viewer perceives that the magnified image elements have substantially the same size as each other on the first image surface.

5. The device according to claim 1, wherein the pitches of the micro-focusing elements and the array of microimage elements and their relative locations are such that the first image surface is positioned behind or in front of the surface of the device.

6. The device according to claim 1, wherein the pitches of the micro-focusing elements and the array of microimage elements and their relative locations are such that the first image surface intersects the surface of the device.

7. The device according to claim 1, further comprising in at least the first region of the device:
   iii) a corresponding second array of microimage elements carried by the substrate, located in a plane substantially coincident with the focal plane of the focusing elements,
   wherein the pitches of the micro-focusing elements and the second array of microimage elements and their relative locations are such that the array of micro-focusing elements cooperates with the second array of microimage elements to generate magnified versions of the microimage elements of the second array due to the moiré effect,
   and such that the viewer perceives that the magnified version of the second array of microimage elements are located on a second image surface which is different from the first image surface, the magnified version of the first array of microimage elements exhibiting movement relative to the magnified version of the second array of microimage elements when the device is tilted.

8. The device according to claim 7, wherein the pitches of the micro-focusing elements and the first and second arrays of microimage elements and their relative locations are such that the second image surface is located above or below the first image surface.

9. The device according to claim 7, wherein the pitches of the micro-focusing elements and the first and second arrays of microimage elements and their relative locations are such that the second image surface intersects the first image surface.

10. The device according to claim 7, wherein the pitches of the micro-focusing elements and the second arrays of microimage elements and their relative locations are such that the second image surface is parallel to the device surface.

11. The device according to claim 7, wherein along at least one axis across at least the first region of the device, the pitch between the microimage elements of the second microimage array and/or between the micro-focusing elements continuously varies across the respective array(s), whereby the moiré effect causes different degrees of magnification of the image elements to occur, such that the second image surface perceived by the viewer is tilted or curved relative to the surface of the device.

12. The device according to claim 7, wherein the first array of microimage elements is in a first color and the second array of microimage elements is in a second color which is different from the first color.

13. The device according to claim 1, wherein the pitch between the microimage elements and/or between the micro-focusing elements additionally varies continuously along at least one axis across a second region of the device, the pitch variation in the second region preferably being in the opposite sense to that in the first region, such that the viewer perceives that the magnified elements are located on a first image surface which is tilted or curved relative to the surface of the device differently to that perceived in the first region.

14. The device according to claim 1, wherein the micro-focusing elements comprise microlenses.

15. The device according to claim 14, wherein the microlenses comprise at least one of spherical lenslets, cylindrical lenslets, plano-convex lenslets, double convex lenslets, Fresnel lenslets and/or Fresnel zone plates.

16. The device according to claim 1, wherein the micro-focusing elements comprise concave mirrors.

17. The device according to claim 1, wherein the microimage elements within each array represent identical indicia, optionally varying in size and/or aspect ratio across the respective array.

18. The device according to claim 1, wherein the microimage elements are printed on the substrate.

19. The device according to claim 1, wherein the microimage elements are formed as grating structures, recesses or other relief patterns on the substrate.

20. A security device according to claim 1.

21. The security device according to claim 20, formed as a security thread, label or patch.

22. The security device according to claim 20, the device being provided in a transparent window of a security document.

23. The security device according to claim 22, wherein the security document is as a banknote, identification card, or passport.

24. An article provided with an optical device according to claim 1.

25. The article according to claim 24, wherein the article comprises one of banknotes, checks, passports, identify cards, certificates of authenticity, fiscal stamps and other documents for security value or personal identity.

* * * * *